(12) United States Patent
Ojeda et al.

(10) Patent No.: US 12,433,787 B2
(45) Date of Patent: Oct. 7, 2025

(54) DEVICES, SYSTEMS, AND METHODS FOR BIOLOGICAL SAMPLE COLLECTION

(71) Applicants: The Regents of the University of Michigan, Ann Arbor, MI (US); The Penn State Research Foundation, University Park, PA (US)

(72) Inventors: Lauro V. Ojeda, Ann Arbor, MI (US); Jeffrey M. Sundstrom, Ann Arbor, MI (US); Justin T. Holmer, Ann Arbor, MI (US); Alan Cruz, Ann Arbor, MI (US); Minghui Huang, Ann Arbor, MI (US); Anant Bhamri, Ann Arbor, MI (US); Hakan Demirci, Ann Arbor, MI (US); Thomas Gardner, Ann Arbor, MI (US); Russ Miller, Ann Arbor, MI (US); Peter Nguyen, Ann Arbor, MI (US)

(73) Assignees: The Regents of the University of Michigan, Ann Arbor, MI (US); The Penn State Research Foundation, University Park, PA (US)

(*) Notice: Subject to any disclaimer, the term of this patent is extended or adjusted under 35 U.S.C. 154(b) by 990 days.

(21) Appl. No.: 17/612,156

(22) PCT Filed: May 21, 2020

(86) PCT No.: PCT/US2020/033995
§ 371 (c)(1),
(2) Date: Nov. 17, 2021

(87) PCT Pub. No.: WO2020/237049
PCT Pub. Date: Nov. 26, 2020

(65) Prior Publication Data
US 2022/0211545 A1    Jul. 7, 2022

Related U.S. Application Data

(60) Provisional application No. 62/850,913, filed on May 21, 2019.

(51) Int. Cl.
*A61F 9/007* (2006.01)
*A61B 10/00* (2006.01)
*A61B 10/02* (2006.01)

(52) U.S. Cl.
CPC ...... *A61F 9/00763* (2013.01); *A61B 10/0045* (2013.01); *A61B 10/0233* (2013.01);
(Continued)

(58) Field of Classification Search
CPC ............ A61F 9/00763; A61B 10/0045; A61B 10/0233; A61B 2010/0208; A61B 10/0283; A61M 5/178; A61M 5/32
See application file for complete search history.

(56) References Cited

U.S. PATENT DOCUMENTS 3,732,858 A    5/1973   Banko
3,776,238 A    12/1973  Peyman et al.
(Continued)

FOREIGN PATENT DOCUMENTS

EP    1110520       6/2001
GB    1050725 A     12/1966
(Continued)

OTHER PUBLICATIONS

International Search Report and Written Opinion for PCT/US20/33995. Mailed Aug. 25, 2020. 15 pages.
(Continued)

*Primary Examiner* — Eric F Winakur
*Assistant Examiner* — Noah M Healy
(74) *Attorney, Agent, or Firm* — CASIMIR JONES, S.C.; Brian F. Bradley

(57) ABSTRACT

A device comprising a syringe comprising a plunger and a barrel having a longitudinal axis and a sample collection
(Continued)

volume. The device further comprises a needle hub including an attachment device for connection with the syringe, and a syringe support connected to the needle hub. A needle is connected to the needle hub, the needle having a lumen. An internal needle is at least partially positioned within the lumen of the needle. The device further includes a motor that rotationally moves the internal needle within the needle. The needle has a first opening formed in a side of the needle, and the internal needle has a second opening formed in a side of the internal needle; and wherein material is allowed to enter when the second opening is aligned with the first opening, and wherein the material is cut when the second opening rotates past the first opening.

24 Claims, 26 Drawing Sheets

(52) U.S. Cl.
CPC ............... *A61B 2010/0067* (2013.01); *A61B 2010/0208* (2013.01)

(56) References Cited

U.S. PATENT DOCUMENTS

| | | | |
|---|---|---|---|
| 4,672,965 A | 6/1987 | Baum | |
| 4,919,146 A | 4/1990 | Rhinehart et al. | |
| 4,940,468 A | 7/1990 | Petillo | |
| 5,987,353 A * | 11/1999 | Khatchatrian | A61B 10/0045 |
| | | | 600/547 |
| 5,989,262 A | 11/1999 | Josephberg | |
| 6,059,792 A | 5/2000 | Josephberg | |
| 6,478,681 B1 | 11/2002 | Overaker et al. | |
| 10,251,782 B2 * | 4/2019 | Farley | H02K 33/16 |
| 2002/0173814 A1 | 11/2002 | Jung et al. | |
| 2007/0173870 A2 | 7/2007 | Zacharias | |
| 2009/0118641 A1 * | 5/2009 | Van Dam | A61B 10/0266 |
| | | | 600/567 |
| 2009/0234274 A1 | 9/2009 | Luloh | |
| 2011/0118542 A1 | 5/2011 | Cucin | |
| 2014/0128771 A1 * | 5/2014 | LaConte | A61B 10/0283 |
| | | | 29/428 |
| 2016/0120697 A1 | 5/2016 | Farley | |
| 2017/0358962 A1 * | 12/2017 | Morton | H02K 3/50 |
| 2018/0207032 A1 | 7/2018 | Charles et al. | |
| 2018/0369016 A1 | 12/2018 | Underwood | |

FOREIGN PATENT DOCUMENTS

| | | |
|---|---|---|
| WO | WO 01/015640 | 3/2001 |
| WO | WO 2008/097755 | 8/2008 |
| WO | WO 2015/061643 | 4/2015 |
| WO | WO 2016/063237 | 4/2016 |

OTHER PUBLICATIONS

Ghodasra et al., Safety and Feasibility of Quantitative Multiplexed Cytokine Analysis From Office-Based Vitreous Aspiration. Invest Ophthalmol Vis Sci. Jun. 1, 2016;57(7):3017-23.

Zhao et al., Liquid Biopsy of Vitreous Reveals an Abundant Vesicle Population Consistent With the Size and Morphology of Exosomes. Transl Vis Sci Technol. May 14, 2018;7(3):6.

EP Search Report, EP Patent Application No. 20810802.7, mailed Mar. 24, 2023, 2 pages.

* cited by examiner

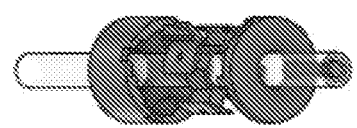
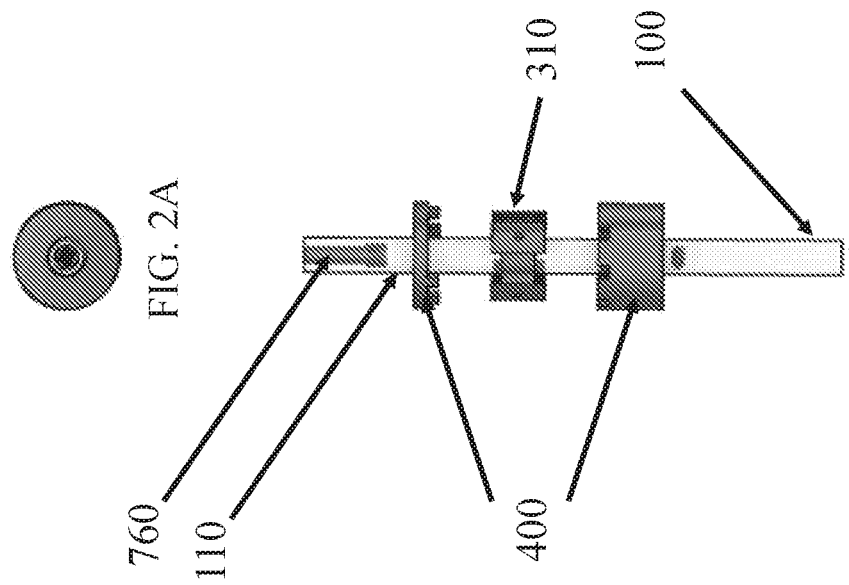

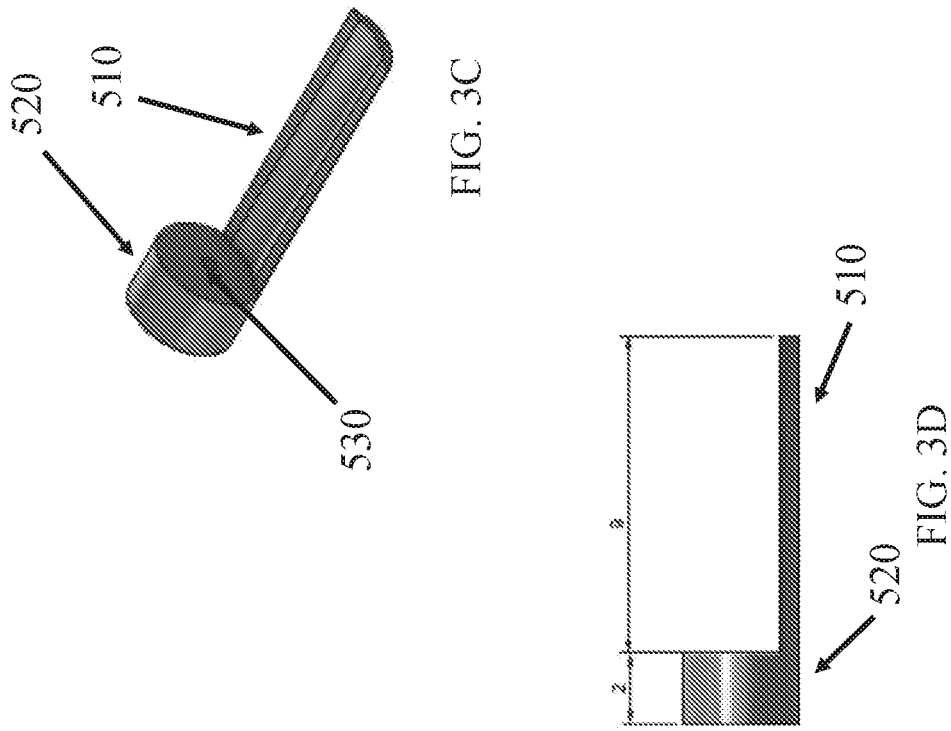
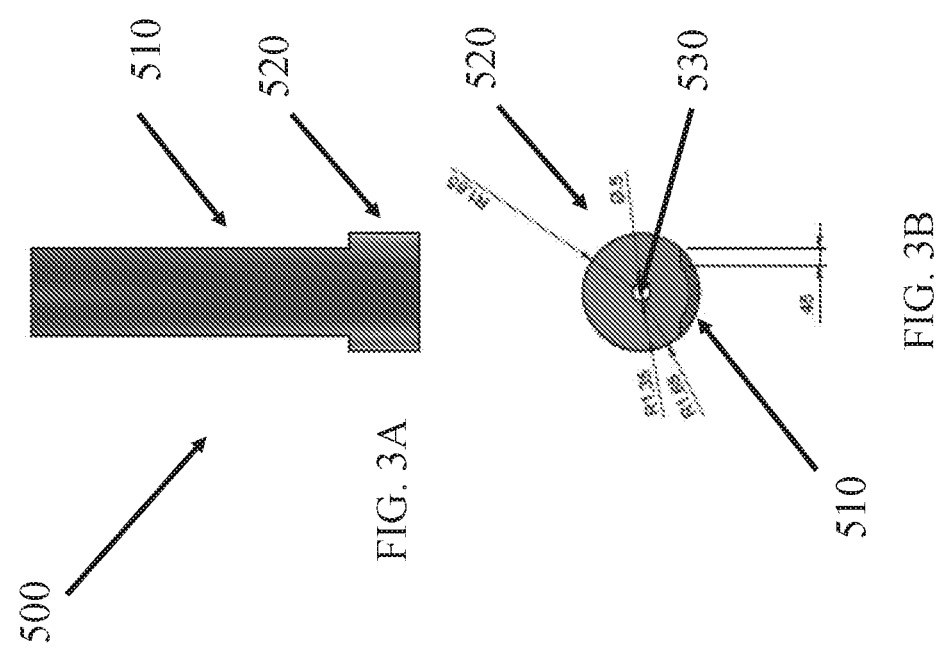

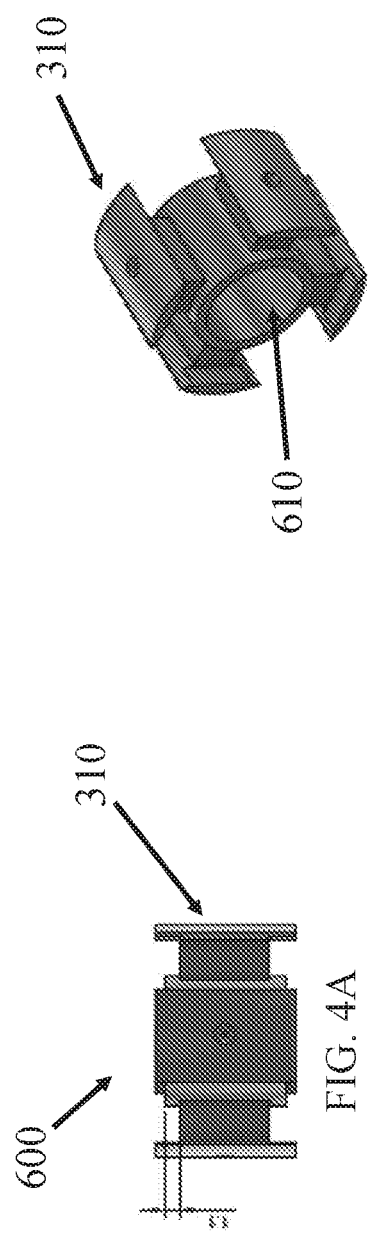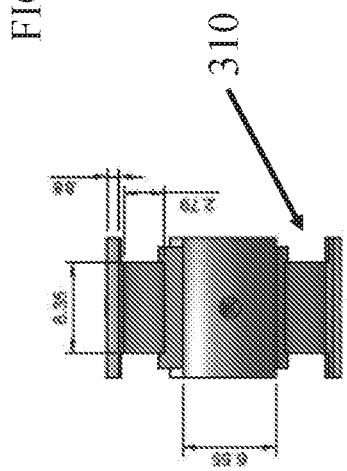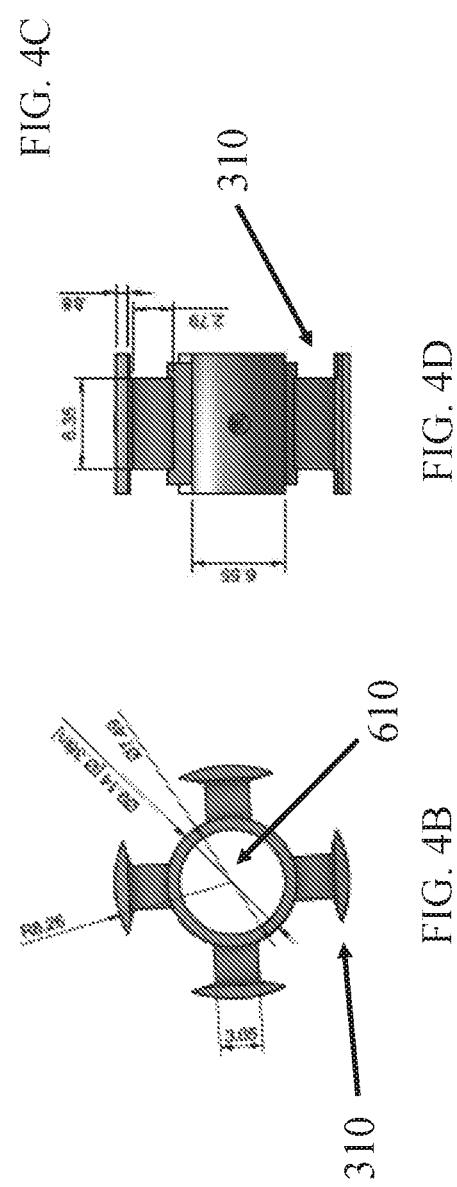
FIG. 4A  FIG. 4B  FIG. 4C  FIG. 4D

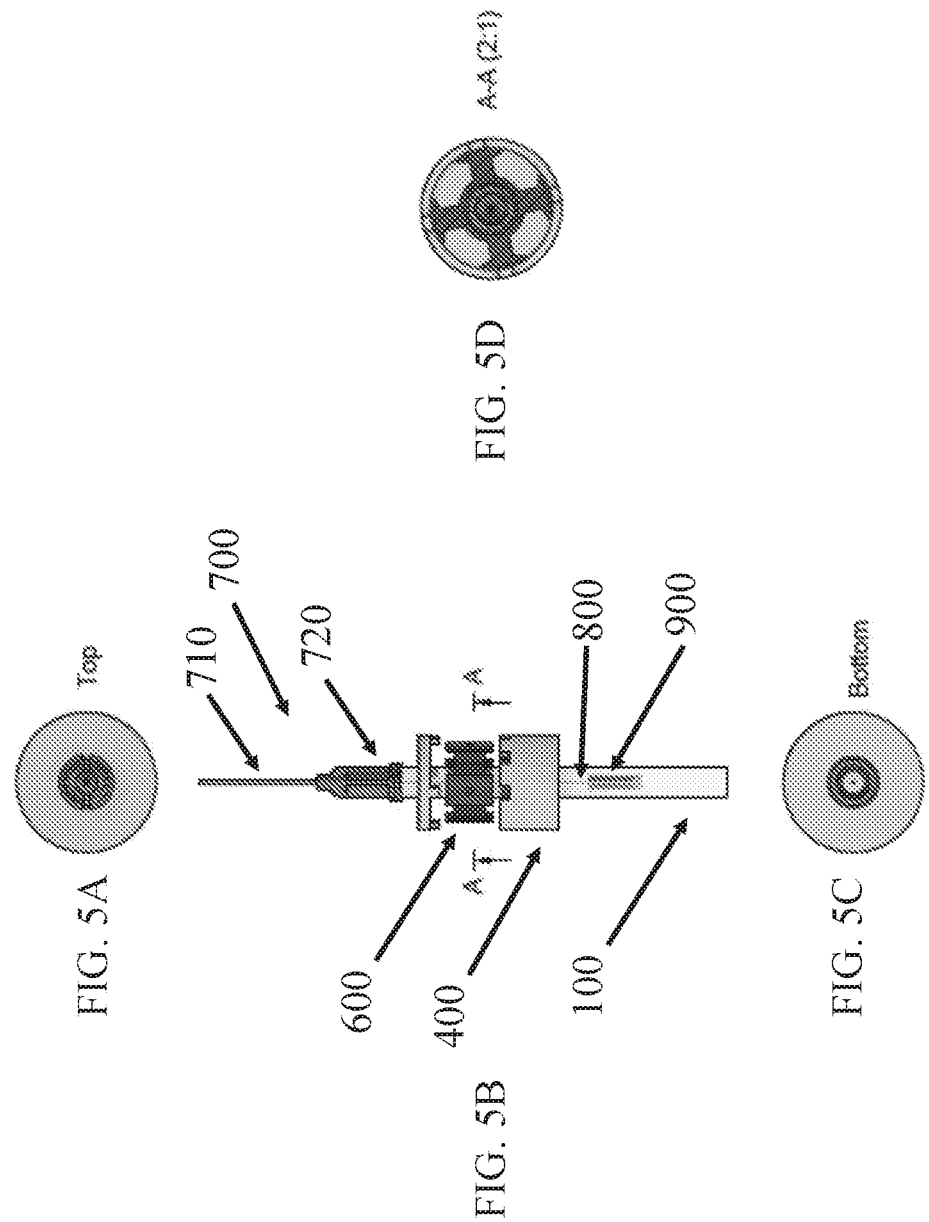

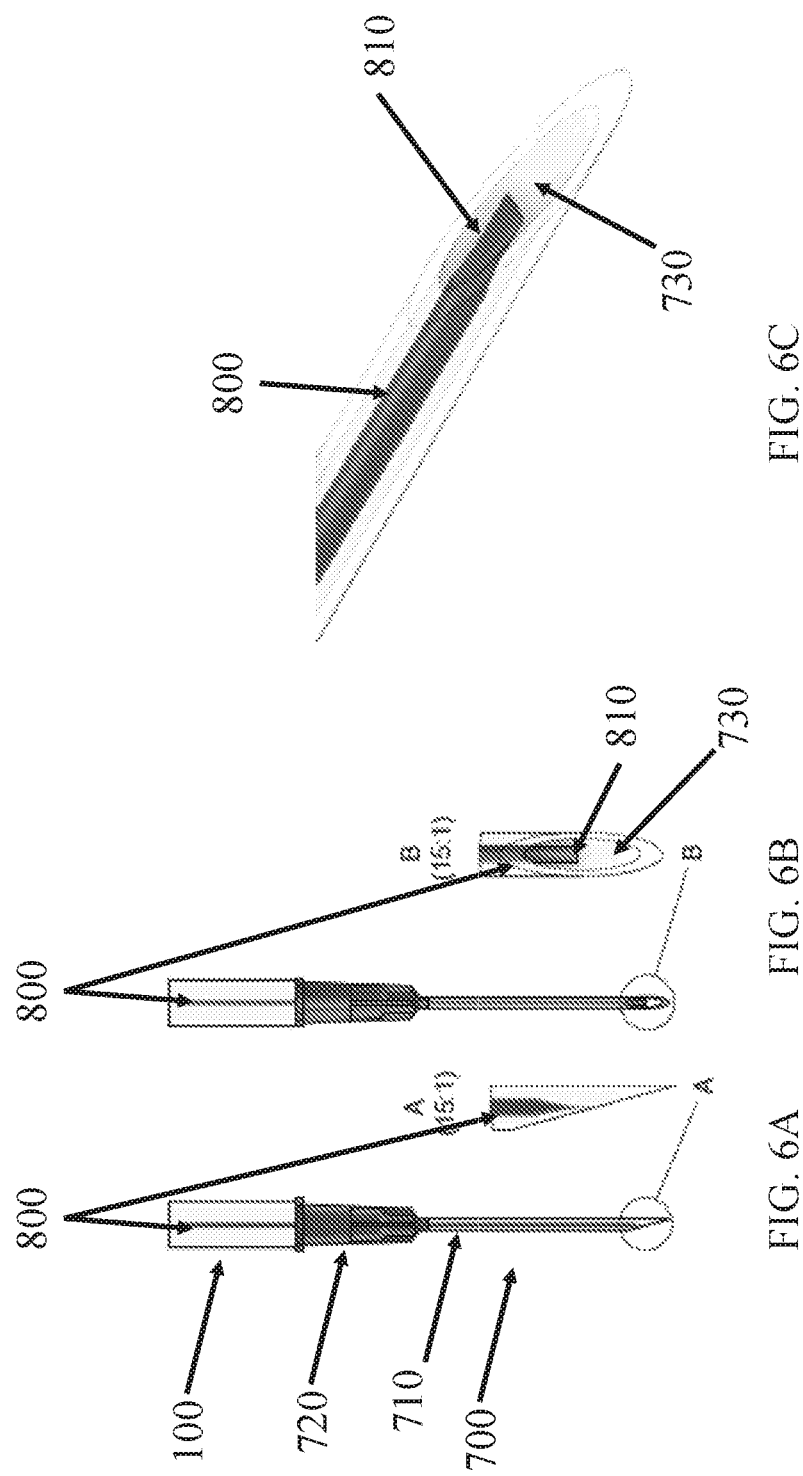

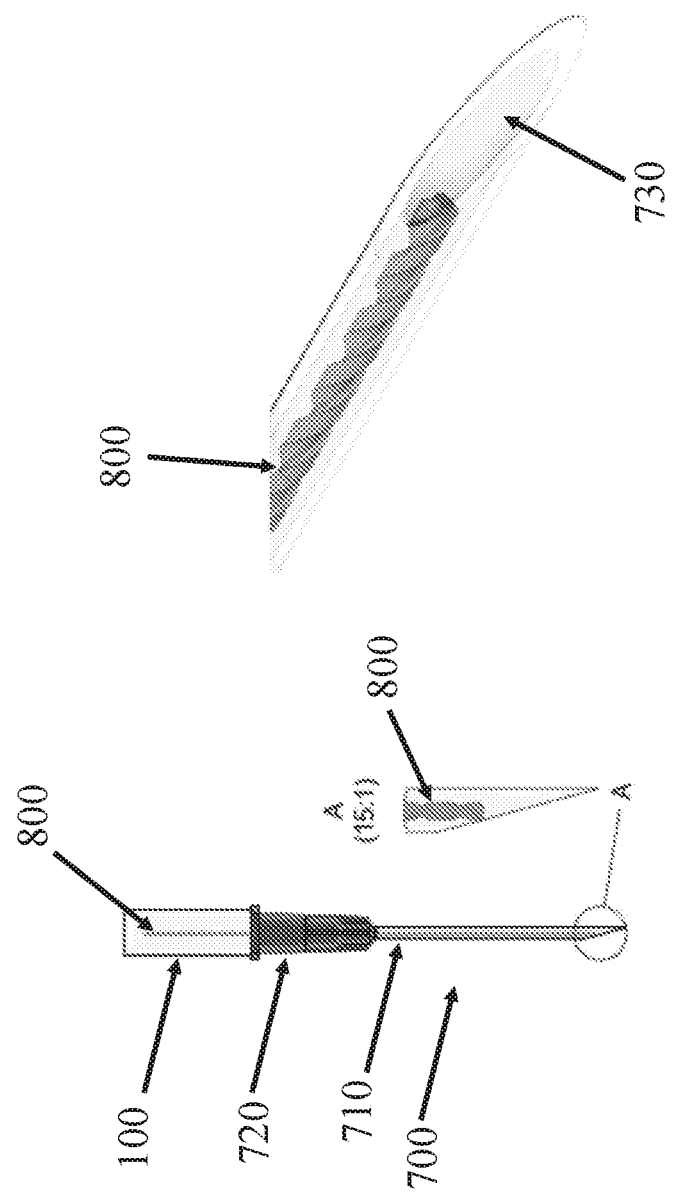

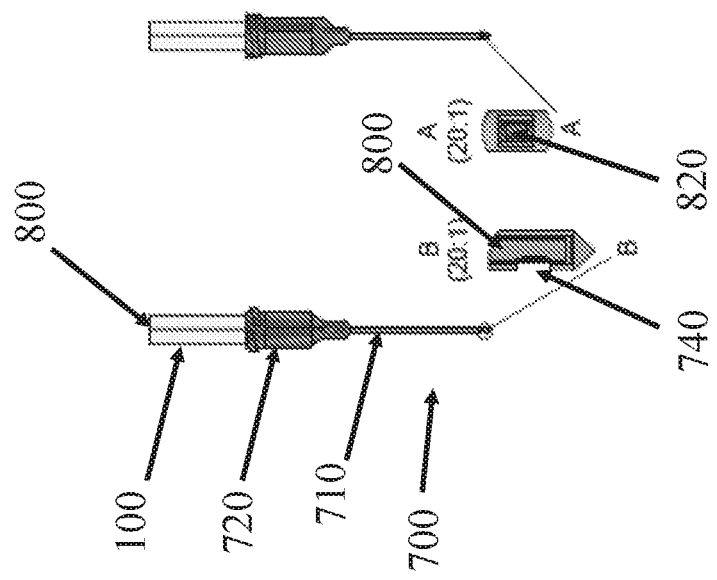
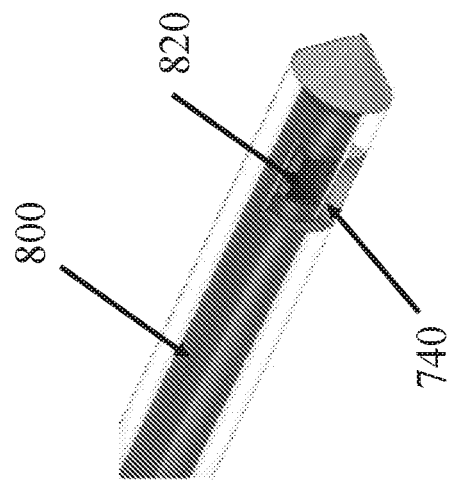
FIG. 8A  FIG. 8B
FIG. 8C

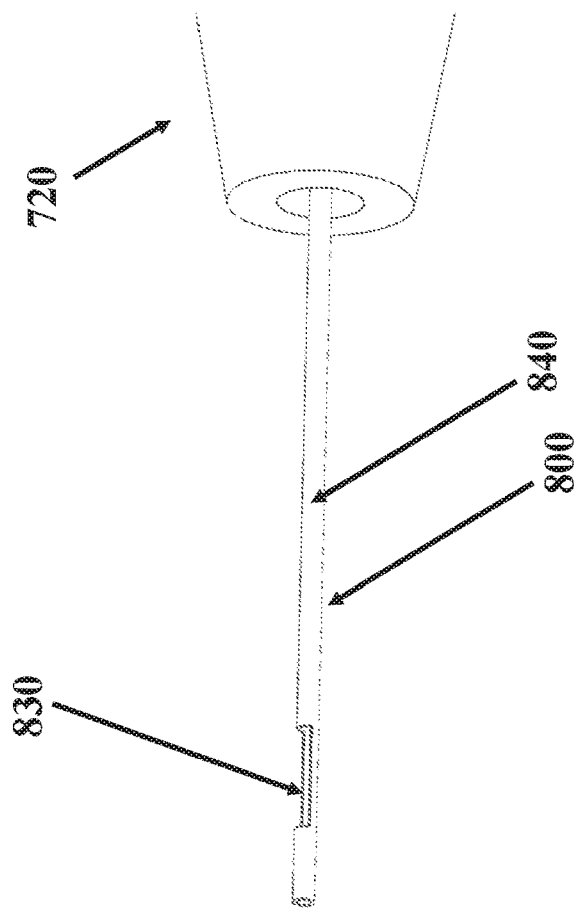
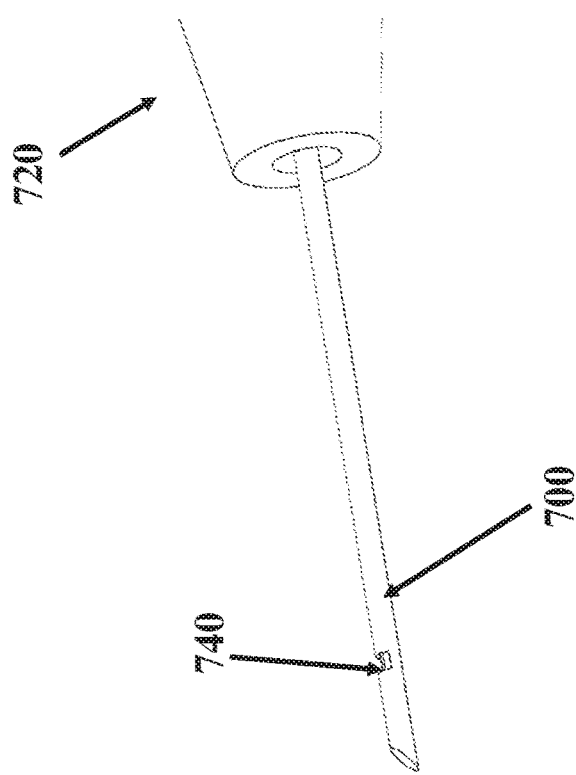
FIG. 11B
FIG. 11A

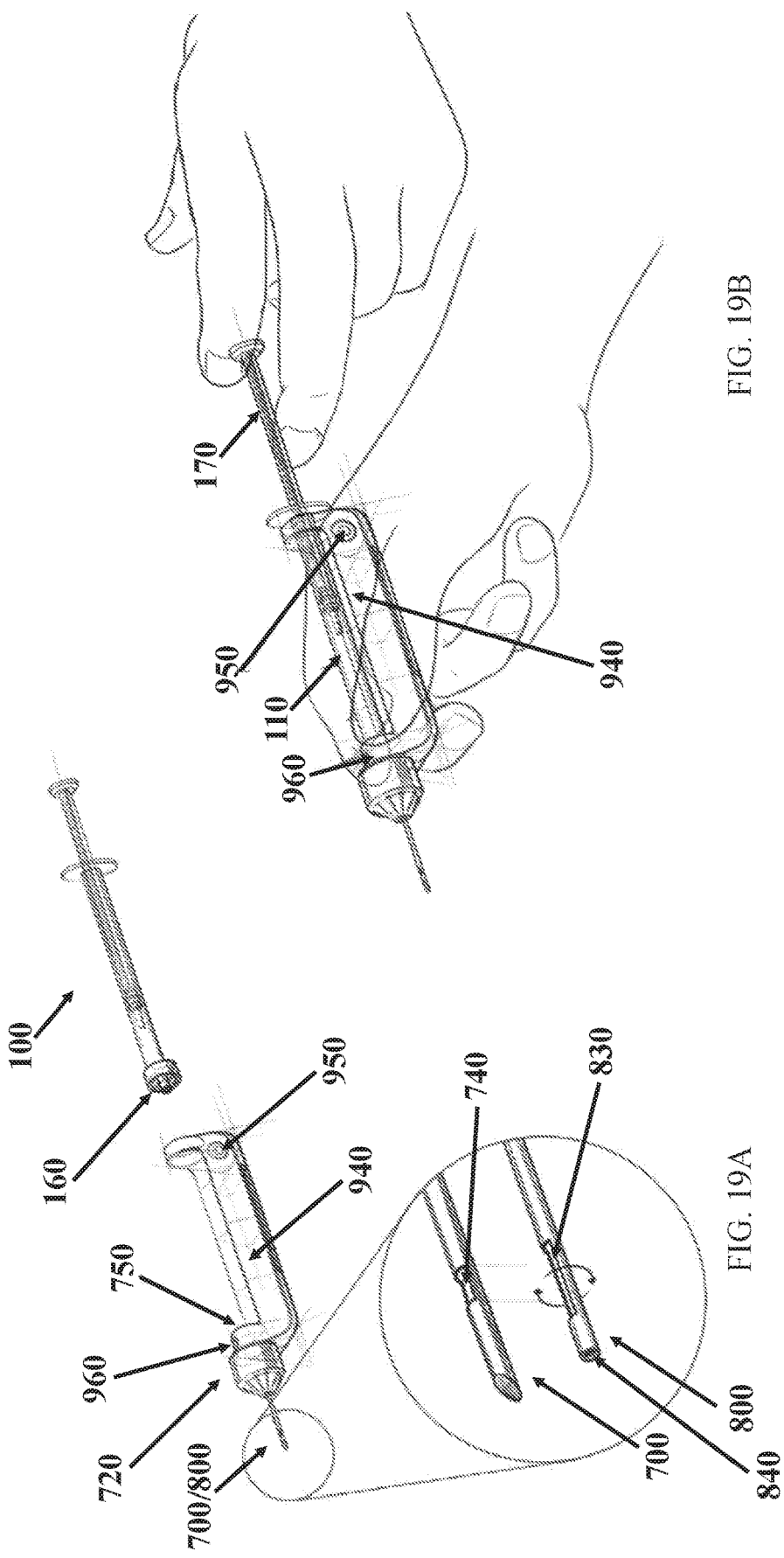

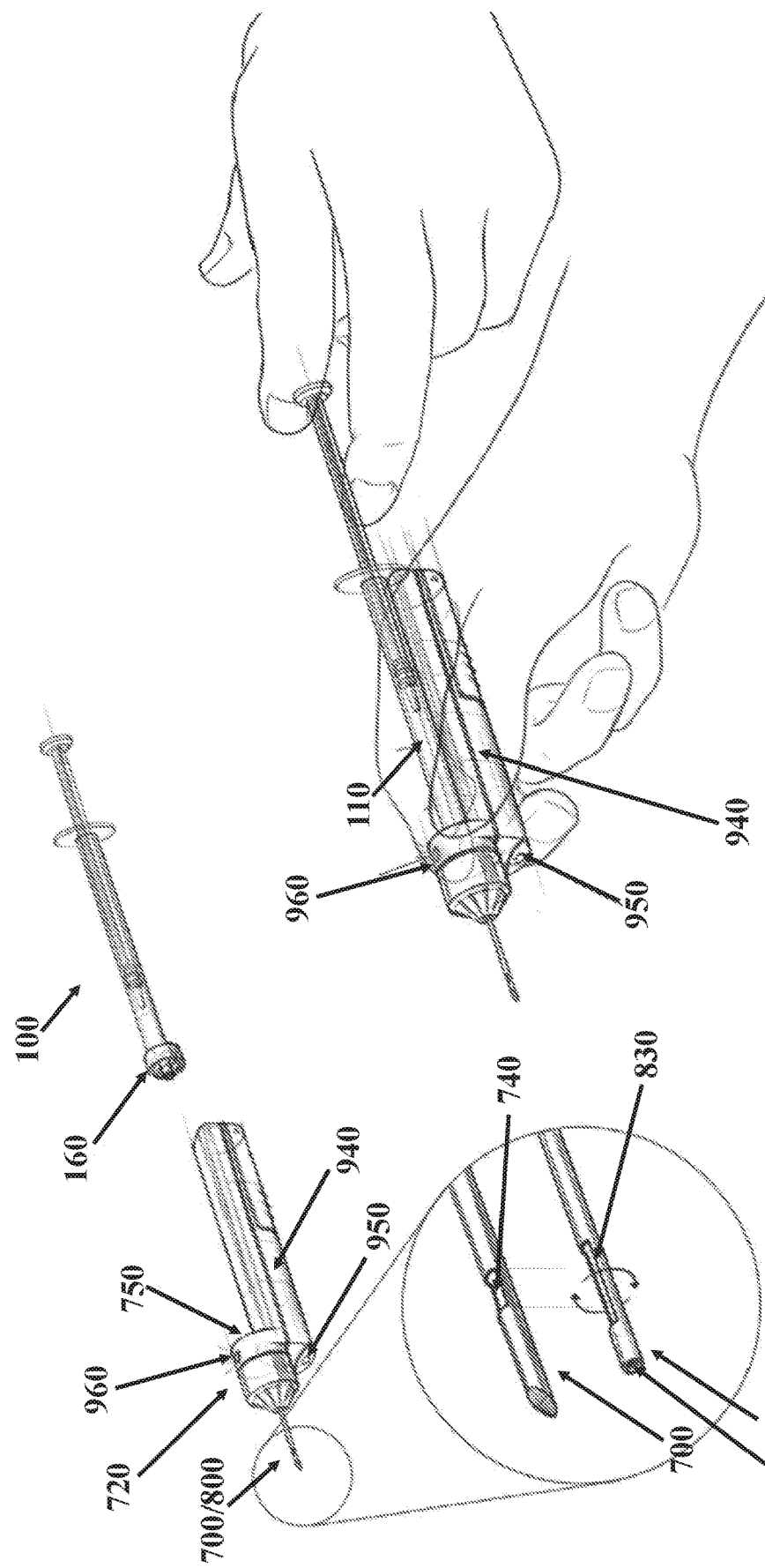

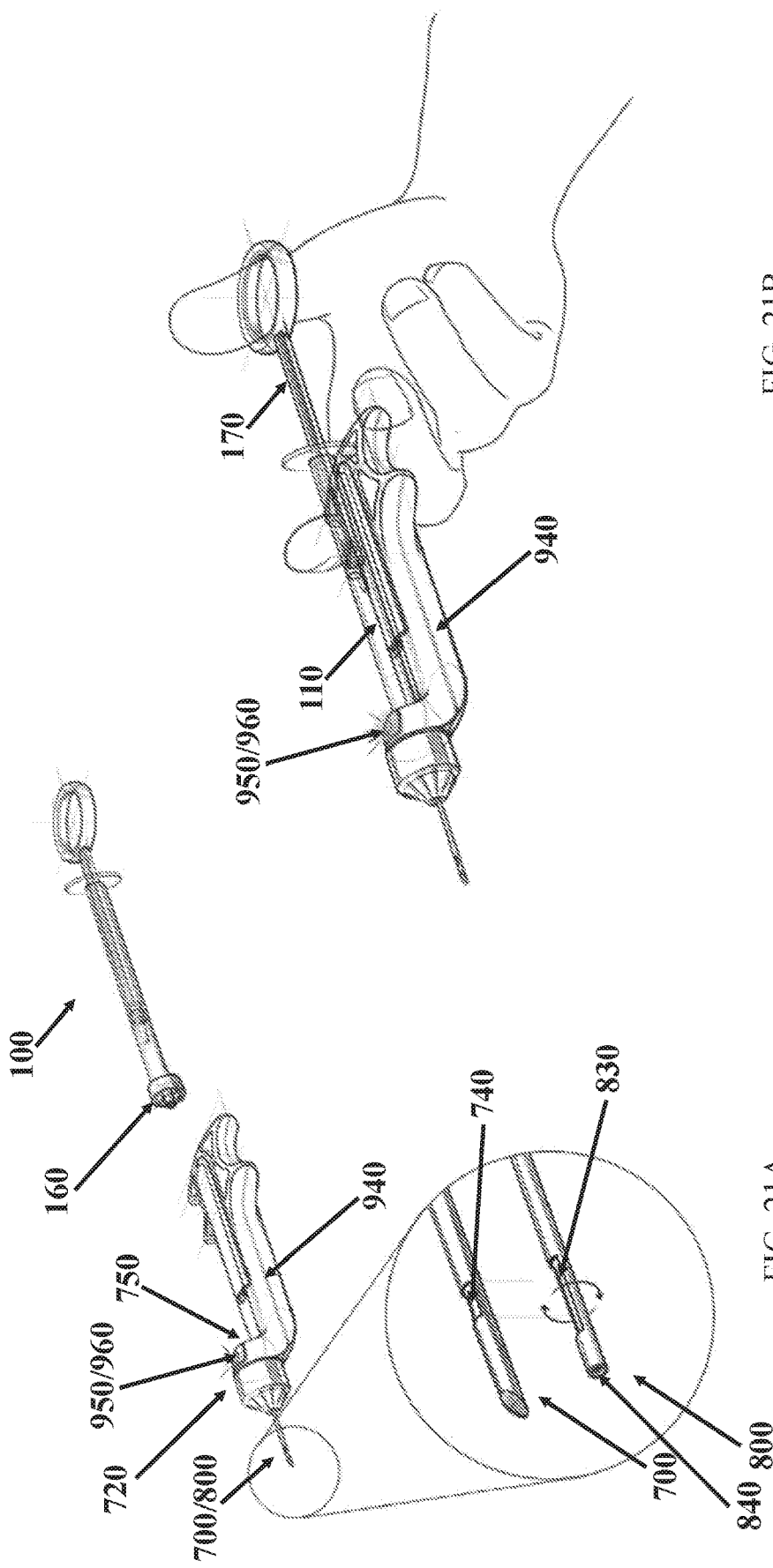

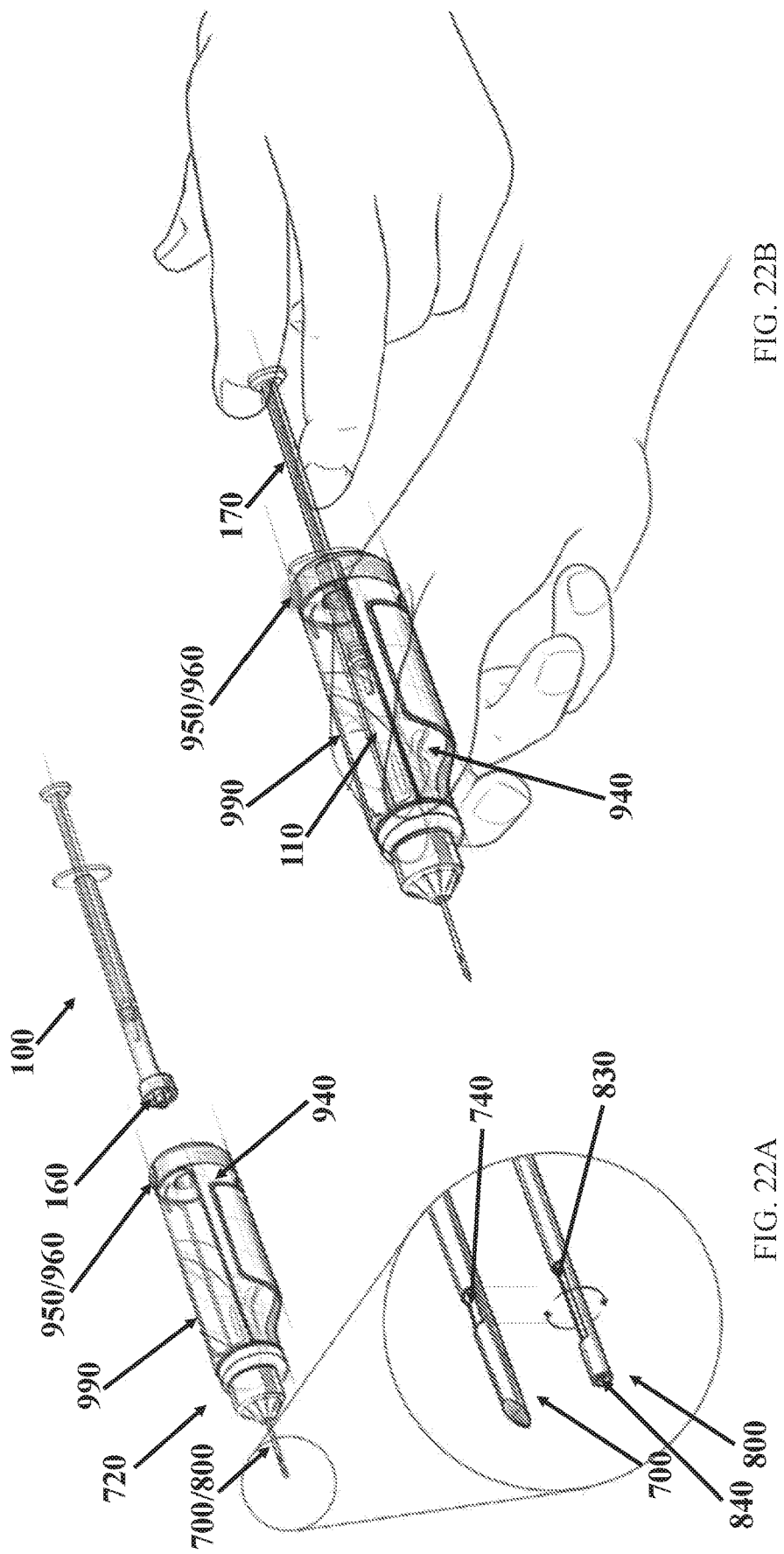

DEVICES, SYSTEMS, AND METHODS FOR BIOLOGICAL SAMPLE COLLECTION

CROSS-REFERENCE TO RELATED APPLICATIONS

This application claims the benefit of U.S. Provisional Application No. 62/850,913, filed May 21, 2019, the entire contents of which are incorporated herein by reference.

FIELD

Provided herein are devices, systems, and methods for biological sample collection. In particular, provided herein are devices, systems, and methods that employ small, hand-held devices that collect small volumes of biological samples, such as vitreous from the eye, for diagnostic, research, and other purposes.

BACKGROUND

Liquid biopsies are increasingly being utilized in diverse medical contexts as a minimally invasive approach to provide real-time information about a patient's disease status. By extracting and analyzing a sample of a given biological fluid, clinicians gain information about the tissue with which that fluid was in contact. Primarily liquid samples, such as blood, urine, and saliva have many suitable options for collection. Other sample types, such as the vitreous, a gelatinous fluid that fills the posterior segment of the eye, present more significant challenges. The vitreous lies in juxtaposition to the light-sensing retina, and liquid vitreous biopsies can thus provide information about vision-threatening retinal diseases. However, the challenges of collecting vitreous samples have limited the availability of diagnostic applications. Moreover, the retina cannot be biopsied in most cases so vitreous biopsies have high clinical importance.

Currently, two types of devices exist for removing vitreous from the eye, one optimized for use in the operating room, and the other optimized for use in clinical settings. Modern operating room devices are based on the vitreous infusion suction cutter, which was designed in the 1970s for vitrectomy surgeries. These operating room units are optimized for removal of the full volume of vitreous and incorporate additional tools to aid vitrectomy surgery such as infusion and illumination. Operating room based vitreous cutting devices are large, difficult to transport, and expensive. Portable vitreous cutters designed for clinical use were developed in the 1990s and partially overcome these drawbacks. Although smaller and slightly lower in cost than their operating room counterparts, these clinical devices have the disadvantages of requiring power cords, two users (an operator and assistant), and simultaneous infusion (administration of a material into the eye to compensate for the material removed). Like the operating room vitreous cutter, the clinical vitreous cutter is also optimized for large-volume sample extraction only.

The high cost, large size, and limited capacity to minimize sample volume of the current operating room and clinical vitreous cutter models impose a steep barrier to broadening the use of liquid vitreous biopsies in clinical settings. Improved devices, systems, and methods are needed.

SUMMARY

Provided herein are devices, systems, and methods for biological sample collection. In particular, provided herein are devices, systems, and methods that employ small, hand-held devices that collect small volumes of biological samples, such as vitreous from the eye, for diagnostic, research, and other purposes.

The systems, devices, and methods are exemplified by collection of vitreous from the eye. It should be understood that the systems, devices, and methods, while particularly effective at vitreous sample collection, are not so limited. A wide variety of sample types may be collected.

With respect to vitreous collection, the systems, devices and methods overcome the unresolved barriers left by the prior art technologies. To overcome these barriers, in some embodiments, the devices herein provide low-cost, hand-held, disposable devices designed to remove a small (e.g., 1 mL or less, 500 uL or less, 250 µL or less, 100 µL or less) sample of vitreous that can then be analyzed for diagnostic purposes. In some embodiments, the devices use a small-gauge needle with cutting action, extracts a small volume of fluid, and requires no infusion component. Together, these design features confer simplification of the procedure for the operator and provide a safe mechanism for liquid vitreous biopsy in the clinical setting.

For example, in some embodiments, provided herein is a device or system comprising one or more or each of: a) a syringe, the syringe comprising a barrel having a longitudinal axis, the barrel comprising a sample collection volume; b) a needle connected to a distal end of the syringe at a needle hub, the needle having a lumen; c) a cutting tool positioned within the lumen of the needle; and d) an actuator that linearly or rotationally moves the cutting tool within the needle. In some embodiments, the actuator is outside the syringe barrel. In some embodiments, the actuator is located at the distal end of the needle hub.

In some embodiments, provided herein is a device or system comprising: a) a syringe comprising i) a cutting tool positioned within a needle lumen, the cutting tool having a proximal end comprising one or more permanent magnets, the cutting tool configured to linearly or rotationally move within the needle lumen, and ii) a barrel having a longitudinal axis, said barrel comprising a sample collection volume; and b) a motor (e.g., electromagnet motor) positioned outside of the syringe configured to linearly or rotationally move the cutting tool under magnetic force. In some embodiments, the motor is outside the syringe barrel. In some embodiments, the motor is located at the distal end of the needle hub.

In some embodiments, provided herein is a device or system comprising: a) a syringe comprising i) a cutting tool positioned within a needle lumen, the cutting tool having a proximal end comprising one or more or metal structures (e.g. squirrel cage or conductive loops), the cutting tool configured to linearly or rotationally move within the needle lumen, and ii) a barrel having a longitudinal axis, said barrel comprising a sample collection volume; and b) a motor positioned outside of the syringe configured to linearly or rotationally move the cutting tool under magnetic force. In some embodiments, the motor is outside the syringe barrel. In some embodiments, the motor is located at the distal end of the needle hub.

In some embodiments, the needle is a 20 gauge or smaller needle (e.g., 24 gauge, 26 gauge or smaller, etc.), hollow with a lumen. The needle may be any standard length (e.g., ⅜ inch to 3½ inch). In some embodiments the needle length is ½ inch. Any desired cutting tool may be employed. In some embodiments, the cutting tool comprises a drill bit (e.g., a twist drill bit). In some embodiments, the cutting tool has a distal end blade. In some embodiments, the cutting tool is configured as a needle within a needle. In some embodiments, the tip of the needle, and optionally, the tip of the cutting tool needle is closed. In some embodiments, the needle and cutting tool have an opening on the side that when aligned allows material to enter, and as the opening closes, it provides a cutting mechanism (guillotine). In some embodiments, the collection volume is 1 mL or less (e.g., 500 uL or less, 250 μL or less, 100 μL or less, etc.).

In some embodiments, the actuator comprises one or more magnet(s). The poles of the magnets may be perpendicular to the needle longitudinal axis for rotational motion or parallel (along) the needle longitudinal axis for linear movement.

In some embodiments, the actuator comprises a plurality of electromagnets positioned around the longitudinal axis. In some embodiments, the actuator comprises a plurality of electromagnets positioned along the longitudinal axis. In some embodiments, the plurality of electromagnets comprises 2 or more (e.g., three, four, five, six or more, etc.) electromagnets. In some embodiments, the plurality of electromagnets comprises four or more electromagnets. In some embodiments, the electromagnets are on the same or different support structure (e.g. stator rings or assemblies). In some embodiments, the electromagnets are on 2 or more support structures. In some embodiments, the support structures are slotted stators. In some embodiments, the actuator comprises a plurality of phase coils. In some embodiments, the actuator comprises one or more slotless stators. In some embodiments, the device is configured to alter a magnetic field by changing the polarity of the electromagnets. In some embodiments, the device is configured to alter a magnetic field by altering the physical position of the magnets or electromagnets.

In some embodiments, the motor comprises a plurality of electromagnets positioned around the longitudinal axis. In some embodiments, the motor comprises a plurality of electromagnets positioned along the longitudinal axis. In some embodiments, the plurality of electromagnets comprises 2 or more (e.g., three, four, five, six or more, etc.) electromagnets. In some embodiments, the plurality of electromagnets comprises four or more electromagnets. In some embodiments, the electromagnets are on the same or different support structure (e.g. stator rings or assemblies). In some embodiments, the electromagnets are on 2 or more support structures. In some embodiments, the support structures are slotted stators. In some embodiments, the motor comprises a plurality of phase coils. In some embodiments, the actuator comprises one or more slotless stators. In some embodiments, the device is configured to alter a magnetic field by changing the polarity the electromagnets. In some embodiments, the device is configured to alter a magnetic field by altering the physical position of the magnets or electromagnets.

In some embodiments, the device further comprises one or more permanent magnets. In some embodiments, the one or more permanent magnets are positioned inside of the barrel (e.g., attached to a proximal end of the cutting tool). In some embodiments, the one or more permanent magnets are positioned inside of the needle hub (e.g., attached to a proximal end of the cutting tool inside the needle hub). In some embodiments, the one or more permanent magnets are replaced by a metal structure (e.g. squirrel cage or other conductive loop structure) designed to produce an electromagnetic force (Lorentz forces) when a varying magnetic field is applied. In some embodiments, the device further comprises a spring or contravening force adjacent to the one or more permanent magnets or metal structure.

The actuator may be powered by any mechanism. In some embodiments, the actuator or motor is powered by a battery and the device comprises a battery compartment housing one or more batteries. In some embodiments, the device comprises a power cord. In some embodiments, the device or system comprises a switch or other control mechanism that activates the actuator.

Further provided herein are systems (e.g., kits) comprising the devices and one or more additional components. Additional components include, but are not limited to, power systems, packaging, instructions, labels, biological samples contained in the device (e.g., collected by the device), computer control systems, diagnostic reagents (e.g., to analyze a sample collected by the device), and the like.

Further provided herein are methods of collecting samples (e.g., biological samples such as vitreous samples) using the devices. In some embodiments, the method comprises: a) positioning a distal end of the needle into a region containing the sample to be collected; b) activating the actuator to rotate the cutting tool; and c) drawing sample into the collection volume. In some embodiments, the method further comprises at least one or all of: attaching a syringe to a needle hub; removing the syringe from the needle hub; attaching an injection fluid syringe to the needle hub, wherein the injection fluid syringe comprises a fluid to be injected; and injecting a fluid into the region. The injection fluid may comprise a pharmaceutical agent. In some embodiments, the method is carried out without infusing or injecting material into the sample location (e.g., eye).

Definitions

To facilitate understanding of the invention, a number of terms are defined below.

As used herein, the term "sample" is used in its broadest sense. In one sense, it is meant to include a specimen obtained from any source, including biological and environmental samples. Biological samples may be obtained from animals (including humans) and encompass fluids, solids, tissues, and gases. Such examples are not however to be construed as limiting the sample types.

As used herein, the term "subject" refers to any animal (e.g., a mammal), including, but not limited to, humans, non-human primates, rodents, and the like. Typically, the terms "subject" and "patient" are used interchangeably herein in reference to a human subject.

As used herein, the term "non-human animals" refers to all non-human animals including, but are not limited to, vertebrates such as rodents, non-human primates, ovines, bovines, ruminants, lagomorphs, porcines, caprines, equines, canines, felines, ayes, etc.

A "syringe" is a device comprising a barrel, typically but not necessarily tube-shaped, for injecting or withdrawing a sample in a thin stream, typically through a hollow needle. Samples are injected or withdrawn via pressure, typically from a reciprocating pump (e.g., employing a piston or plunger). A plunger can be linearly pulled and pushed along the inside of the barrel, allowing the syringe to take in and expel liquid or gas through a discharge orifice at the front (open) end of the tube. The open end of the syringe may be fitted with a hypodermic needle, a nozzle or a tubing to help direct the flow into and out of the barrel. The open end of the syringe may be fitted with a cutting apparatus comprising a needle and cutting tool, as described herein.

A needle "gauge" refers to the diameter of a needle. Different gauge systems are known in the art. For purposes of referring to specific dimensions, the numerical gauge values provided herein employ the Birmingham gauge (also known as the Stubs Iron Wire Gauge or Birmingham Wire Gauge). Table 1 below provides internal and external diameter values.

TABLE 1

Inner and outer diameter for representative needle gauges

| Gauge | Nominal outer diameter (mm) | Nominal inner diameter (mm) |
|---|---|---|
| 16 | 1.651 (+/−0.013) | 1.194 (+/−0.038) |
| 18 | 1.270 (+/−0.013) | 0.838 (+/−0.038) |
| 20 | 0.9081 (+/−0.0064) | 0.686 (+/−0.019) |
| 22 | 0.7176 (+/−0.0064) | 0.413 (+/−0.019) |
| 24 | 0.5652 (+/−0.0064) | 0.311 (+/−0.019) |
| 26 | 0.4636 (+/−0.0064) | 0.260 (+/−0.019) |
| 28 | 0.3620 (+/−0.0064) | 0.184 (+/−0.019) |
| 30 | 0.3112 (+/−0.0064) | 0.159 (+/−0.019) |
| 32 | 0.2350 (+/−0.0064) | 0.108 (+/−0.019) |
| 34 | 0.1842 (+/−0.0064) | 0.0826 (+/−0.019) |

BRIEF DESCRIPTION OF THE DRAWINGS

FIGS. 2A-2D show an exemplary device having a stator mounted to the outside of a syringe barrel.

FIGS. 3A-3D show an exemplary magnet attachment component.

FIGS. 4A-4D show an exemplary stator.

FIGS. 5A-5D show an exemplary device comprising a needle.

FIGS. 6A-6C show an exemplary needle and rotating cutting tool configuration.

FIGS. 7A and 7B show an exemplary needle and rotating cutting tool configuration.

FIGS. 8A-8C show an exemplary needle and rotating cutting tool configuration.

FIGS. 11A and 11B show the needle (FIG. 11A) and cutting tool (FIG. 11B) for an exemplary needle within a needle cutting tool configuration.

FIGS. 19A-19C show alternate views of an exemplary device comprising a syringe support with integrated battery and electronics.

FIGS. 20A-20C show alternate views of an exemplary device comprising a syringe support with integrated battery and electronics.

FIGS. 21A-21C show alternate views of an exemplary device comprising a syringe support with integrated battery and electronics.

FIGS. 22A-22C show alternate views of an exemplary device comprising a syringe support with integrated battery and electronics.

DETAILED DESCRIPTION

Figure 1:
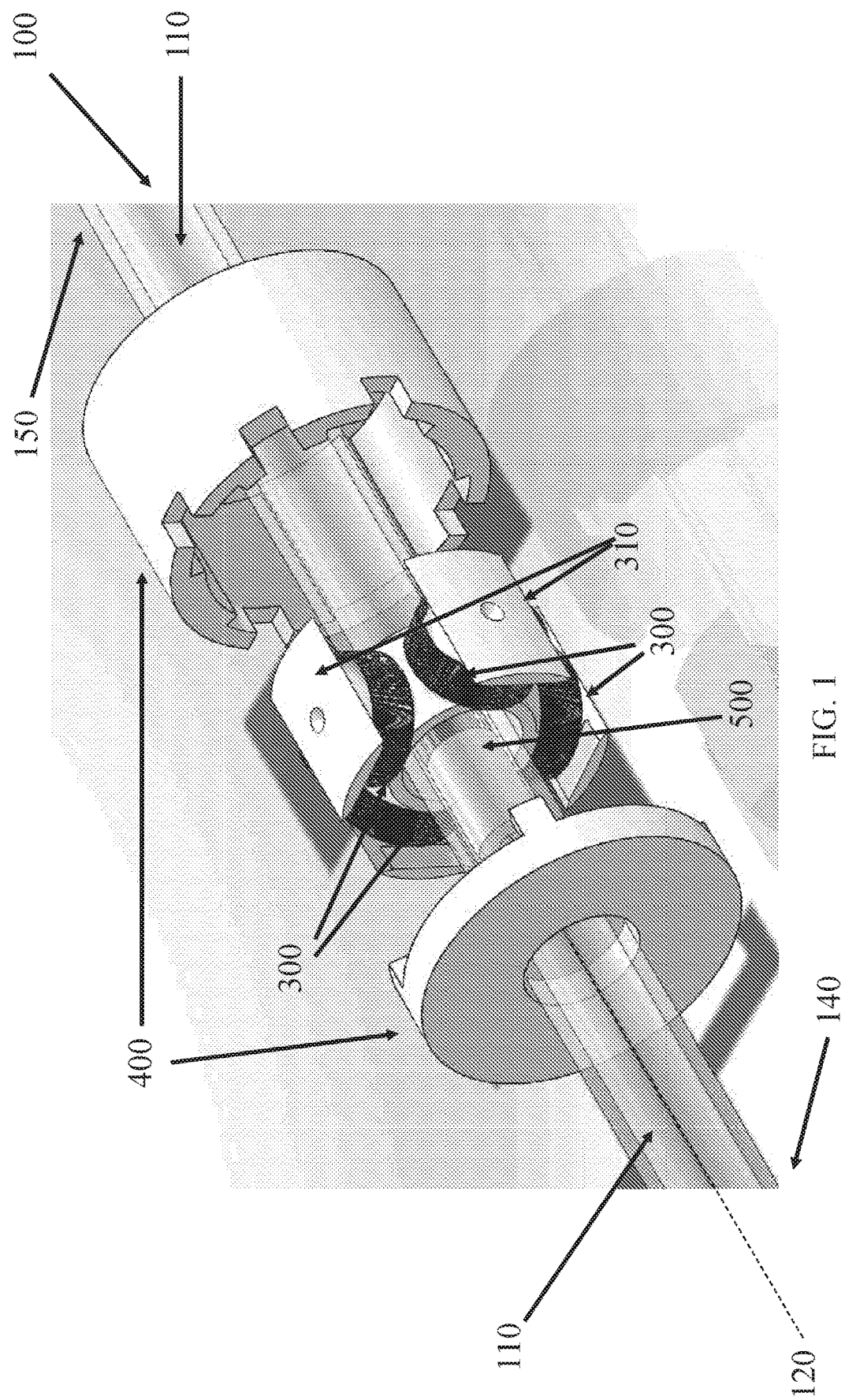
FIG. 1 shows an exemplary device having an electromagnet motor mounted to the outside of a syringe barrel.

Illustrative embodiments of the invention are shown in the figures. It should be understood that the invention is not limited to these particular examples.

The components of the devices may be made of any suitable material, including, but not limited to, metals, plastics, and ceramics. When used in a medical setting, the materials are preferably non-allergenic and sterilizable.

While collection of diagnostic volumes of vitreous fluid is used to highlight features and advantages of the systems, devices, and methods, the invention is not limited to this sample type or to diagnostic methods. The systems, devices, and methods find use in the collection of any sample type that can be drawn into a needle with or without the aid of the cutting tool. The systems, devices, and methods also find use in research and clinical therapeutic settings.

There are many scenarios in which small-volume liquid vitreous biopsies using the systems, devices, and methods finds use. It is currently difficult to obtain vitreous samples from patients with infectious eye diseases and eye cancers. For example, endophthalmitis, an extremely painful and vision-threatening infection of the inside of the eye (where vitreous is located), can be caused by diverse microorganisms. Determination of the correct pharmacological intervention in a given case of endophthalmitis requires identification of the causal microbe, and this necessitates sample extraction and culturing of the contained bacteria. Liquid vitreous biopsies are readily applicable to this process. Similarly, viral retinitis can result from infection by numerous types of viruses, and vitreous liquid biopsies can be used in an analogous manner to identify the causal virus and delineate the appropriate treatment. This approach can also be applied to uveitis, another infectious eye disease which can be caused by a broad spectrum of viruses, parasites, or fungi. Additionally, liquid vitreous biopsies are readily applied to ocular cancers, such as uveal melanoma and primary intraocular lymphoma.

In these contexts, analysis of vitreous fluid allows for earlier detection and more accurate predictions of prognosis. In addition to these applications, expansion of the use of liquid vitreous biopsies in a clinical setting allows for a precision-medicine approach to diagnosing and treating retinal disease and enables biomarker identification and novel therapeutic developments across a wide range of retinal diseases.

Thus, liquid biopsies provide a useful, minimally invasive approach for gleaning critical information from a given biological fluid about its abutting tissue and finds use for monitoring retinal disease status. Current devices for vitreous extraction are cumbersome, expensive, and poorly suited for small-sample aspiration, making them sub-optimal for liquid vitreous biopsy in an outpatient setting. These limitations delay definitive diagnoses and treatments. To overcome these barriers, the systems, devices, and methods provide, for example, an inexpensive, hand-held, disposable device to extract small-volume vitreous samples, enabling streamlined analysis. The systems, devices, and methods find use with ocular infections and cancers for diagnostic and pharmaceutical purposes, and facilitate a personalized approach to diagnosis, prognosis, and treatment of a more diverse set of retinal diseases.

The vitreous fluid needs to be cut for extraction to minimize the risk of retinal detachment. In some embodiments, the devices comprise a magnet attached to the cutting tool and manually actuates the cutting tool linearly and/or rotationally with a second magnet on the outside of the syringe. The design may cut and extract the fluid simultaneously. In some embodiments, a small motor is used to rotate a gear that houses an external magnet to rotate the needle. The design does not vary the speed of rotation. In some preferred embodiments, a brushless motor is employed to vary the speed of the rotation, reducing vibration and delivering a hands-free cutting action.

An exemplary device is shown in FIG. 1. A syringe 100 comprises a barrel 110. The syringe may use any desired mechanism for extracting and/or injecting materials, including, but not limited to, a plunger, a piston, and a pump (not shown). The extracting/injecting mechanism may be actuated mechanically (e.g., by hand by a user), electrically, or by any other desired approach. The external and internal dimensions of the barrel are selected to house a desired volume of collected material and for usability and convenience. In some embodiments, the barrel stores 5 mL or less of sample (e.g., 2 mL or less, 1 mL or less, 500 uL or less, 250 µL or less, 100 µL or less). Existing commercial syringe barrels may be employed (e.g., a Luer-lock syringe barrel). A longitudinal axis 120 runs through the center of the barrel 110. The barrel comprises a distal end 140 (extraction/injection end) and proximal end 150. In some embodiments, a needle is connected to the distal end (not shown).

The device of FIG. 1 employs a motor to actuate a cutting device (not shown) positioned inside of the needle. The motor in FIG. 1 is composed of four electromagnets 300 made of wire wrapped around wire mounts 310, shown here as a slotted stator. Wire mounts 310 may comprise iron, essentially resulting in the electromagnets 300 having a ferromagnetic core. Alternatively, the motor or actuator may comprise a plurality of phase coils, made up of wrapped or wound wires, as in a slotless stator design. Any number of electromagnets may be employed (e.g., 2, 4, 6, 8, etc.). The electromagnets may be directly or indirectly attached to the outer surface of the barrel. In FIG. 1, the inner surface of the stator contacts the outer surface of the barrel. The stator may be fixed to the barrel by pressure, an adhesive, or any other desired connection mechanism. In a prototype used to generate the data in Example 1, a Gorman Star Winder D winding machine (Gorman Machine Corporation, Middleborough, Mass.) was used to wrap two 40-gauge copper wires around the four poles of the wire mount. For rotational motion, the wire was wrapped in the same direction on opposite side poles. For example, if one pole is wrapped counterclockwise, then the pole directly across from it is also wrapped counterclockwise to ensure that opposite magnetic poles face towards the syringe when a current is induced. From the electro-mechanics point of view, the above described design closely resembles a brushless motor. Permanent magnet(s) (not shown) are conveniently located inside the barrel of the syringe while keeping the electronics outside. In some embodiments, the permanent magnets are housed in a magnet attachment component 500 that fits within the inner diameter of the barrel 110. In some embodiments, the magnet attachment component 500 has an outer diameter that is similar to the inner diameter of the barrel to provide a snug fit within the barrel 110. In some embodiments, the magnet attachment component 500 is fixed to the inner surface of the barrel 110 (e.g., via an adhesive) (magnet not shown). In some embodiments, the magnet attachment component 500 is moveable within the barrel. In some embodiments, the magnet attachment component 500 has an open center in which one or more permanent magnets and a cutting tool are positioned to facilitate rotation of the cutting tool in the magnetic field created by activation of the electromagnetic poles 300. A housing 400, shown here as two detached and separated sub-components, encloses and protects the electronics.

FIGS. 2A-D show different views of an exemplary device, here showing the end of a proximal end of a needle housing 760 positioned within the barrel 110 of the syringe 100. FIG. 2A shows a distal end view looking into the longitudinal axis of the syringe barrel. FIG. 2B shows a side view. FIG. 2C and FIG. 2D show angled side views.

FIGS. 3A-D shows different views of an exemplary magnet attachment component 500, with exemplary dimensions (in millimeters). In this embodiment, the magnet attachment component 500 comprises a stabilization sleeve 510 sized to contact and fit securely within the internal diameter of the syringe barrel. The magnet attachment component 500 further comprises a rotating tool guide 520, here having a diameter dimensional to contact and fit securely within the internal diameter of the syringe barrel throughout its circumference. A channel 530 is provided in the rotating tool guide. The channel is fitted with a small permanent magnet and a cutting tool (not shown), which rotates within the channel 530 in response to activation of the electromagnets positioned outside of the syringe barrel. FIG. 3A shows a bottom view of the magnet attachment component 500. FIG. 3B shows an end view of the magnet attachment component 500. FIG. 3C shows an angled side view of the magnet attachment component 500. FIG. 3D shows a side view of the magnet attachment component 500.

FIGS. 4A-D show different views of an exemplary stator 600, with exemplary dimensions (in millimeters). The exemplary stator has four wire mounts 310. Any number of desired wire mounts may be used. For example, in a slotless design, no wire mounts are used. The stator 600 has a central channel 610 sized to fit the outer diameter of the syringe. FIG. 4A shows a side view of the stator 600. FIG. 4B shows an end view of the stator 600. FIG. 4C shows an angled side view of the stator 600. FIG. 4D shows an alternative side view of the stator 600.

FIGS. 5A-D show different views of an assembly of the stator 600 and housing 400 mounted on the syringe 100. Needle 700 comprising needle shaft 710 is attached to the distal end of the syringe 100 via needle hub 720. FIG. 5A shows a top view (end view from the proximal end of the syringe) of the assembly. FIG. 5B shows a side view of the assembly. FIG. 5C shows a bottom view (end view from the distal end of the syringe) of the assembly. FIG. 5D shows a cross-sectional view of the assembly at position the A-A cross-section identified in FIG. 5B. The proximal end of cutting tool 800 is shown attached to permanent magnet 900. In use, permanent magnet 900 is fitted into the magnet attachment component (not shown) under the stator to facilitate rotation of the cutting of the cutting tool 800.

FIGS. 6A-C show an exemplary needle 700 and cutting tool 800 configuration. Needle 700 is mounted to the distal end of syringe 100 via needle hub 720. Cutting tool 800 is positioned within the lumen of needle shaft 710. Expanded views of the needle tip are shown at 15:1 aspect ratio showing the tip 810 of the cutting tool 800 positioned in the bevel 730 of the needle tip. FIG. 6A shows a side view. FIG. 6B shows a top view. FIG. 6C shows an expanded angled side view. The exemplary cutting tool 800 has a tapered tip 810. The proximal end of the cutting tool 800 extends out of the needle lumen and into the syringe where it is connected to the magnetic attachment component (not shown) to facilitate rotation of the cutting of the tool and rotation of the cutting tool tip 810 within the needle lumen. In this design, a cutting action occurs on the side. A side cut is made such that when the tip of the cutting tool is aligned, lets material in, and when closing creates a guillotine effect. FIGS. 7A and 7B show an alternative cutting tool 800 design, in this instance a twist drill bit configuration. FIGS. 8A-C show yet another alternative cutting tool 800 design, in this instance, the needle 700 does not terminate in a traditional bevel, but rather contains an opening 740. The cutting tool 800 contains a hollow portion 820 that provides a cutting action when rotated. In some embodiments, the tip of the cutting tool has a blade chisel-like design that is similar to a regular needle, but with a flattened, wider tip to cut the vitreous and clear the end of the external needle with each cut. The blade edge may use different designs (e.g., chisel, convex, asymmetrical, hollow) for improved cutting action. In some embodiments, the cutting tool employs a double-sided razor-blade-like design, whereby the cutting edge is located along the sides of the internal rotating portion. Combinations of different cutting designs may also be employed.

Figure 9:
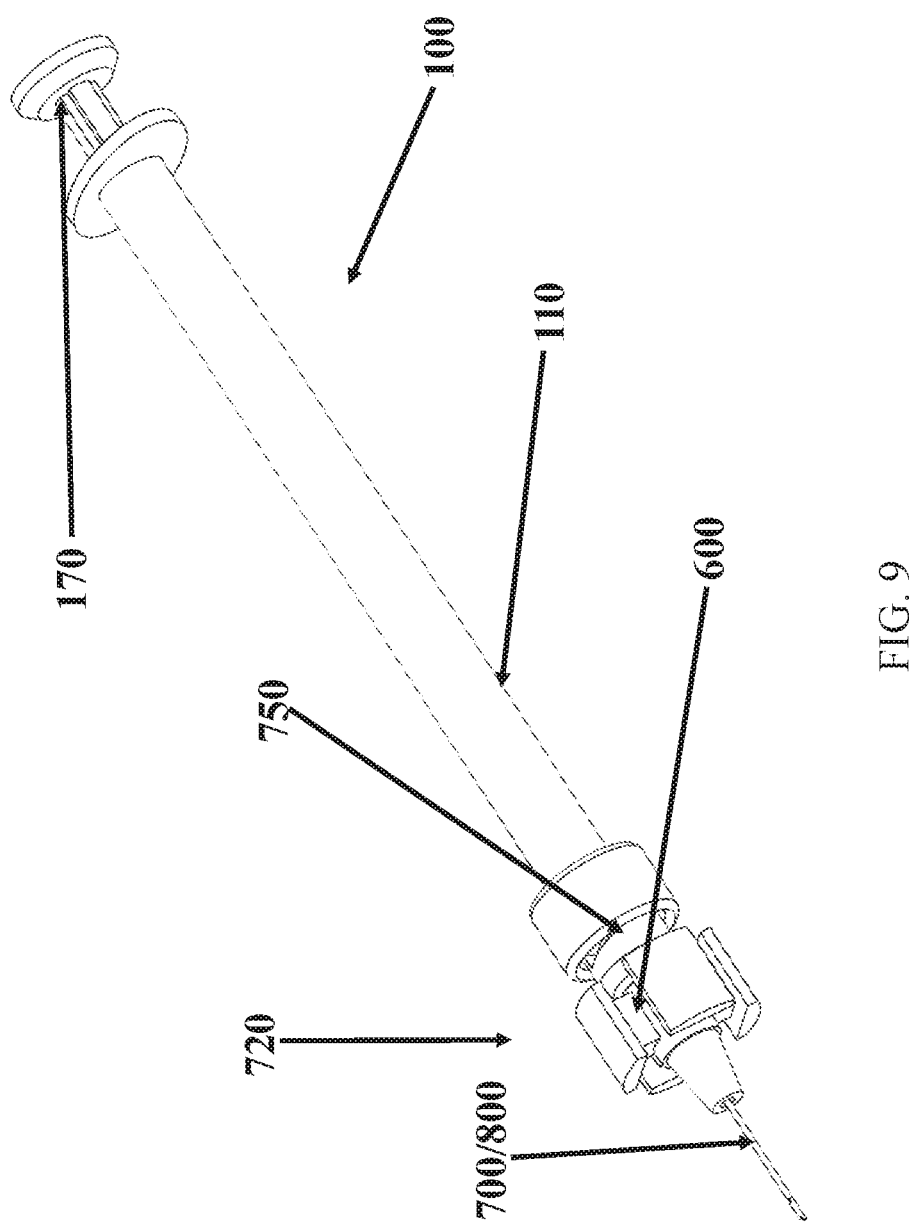
FIG. 9 shows an exemplary device having an electromagnet motor mounted on the distal end of the needle hub attached to a syringe.

FIG. 9 shows an exemplary device having a motor mounted on the distal end of the needle hub 720 attached to syringe 100. Syringe 100 comprises syringe barrel 110 and plunger 170. Needle 700, comprising in its lumen cutting tool 800, is attached to the distal end of the syringe 100 via needle hub 720. The device may be used with any of the needle 700 and cutting tool 800 configurations described above. In this design, stator 600 is external to or mounted on the outside of the needle hub 720, such that the inner surface of the stator contacts the outer surface of the needle hub. The permanent magnet and proximal end of the cutting tool (not shown) are housed inside the needle hub 720. The proximal end of needle hub 720 comprises attachment device 750 for secure integration and connection with syringe 100.

Figure 10:
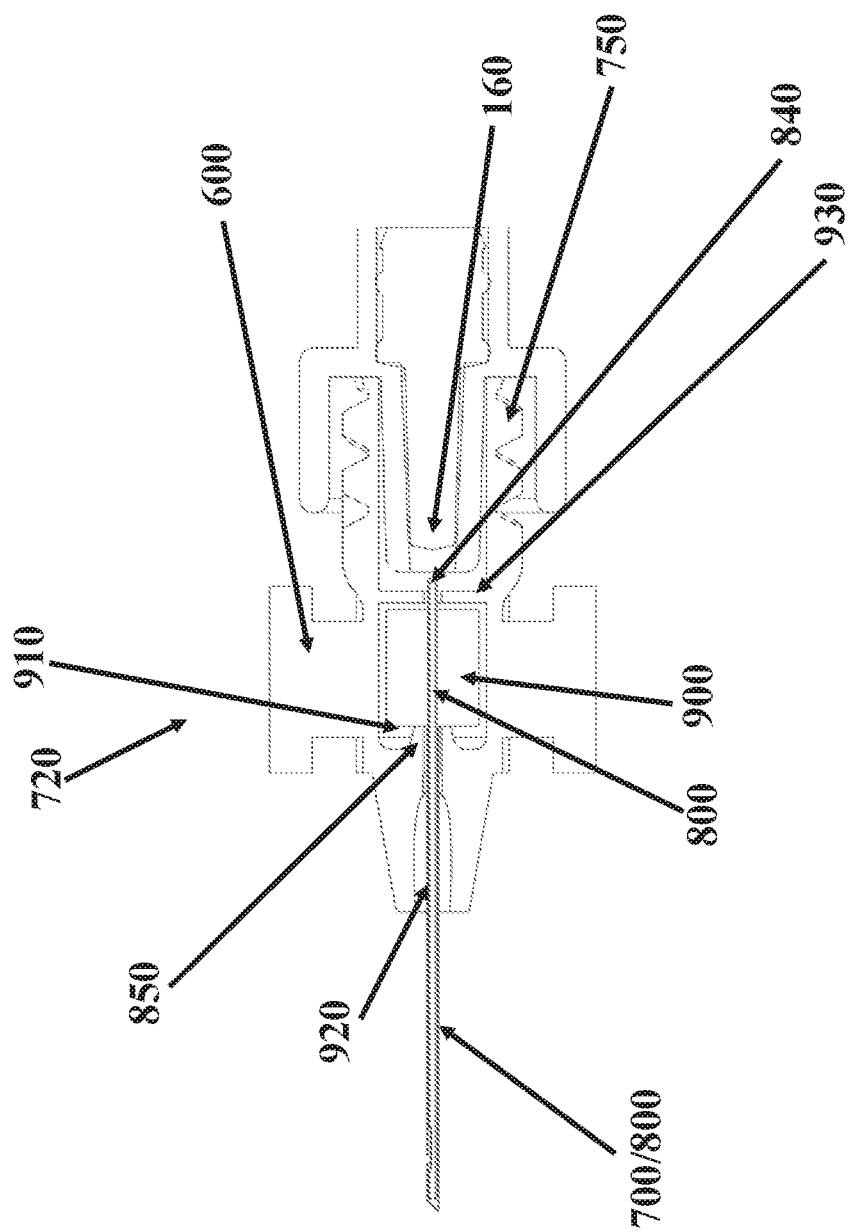
FIG. 10 shows a cross-sectional view of an exemplary device having a stator and magnet mounted to the distal end of the needle hub.

FIG. 10 shows a cross-sectional view of an exemplary device having a motor mounted on the distal end of the needle hub 720 with the stator 600 mounted outside the distal end of the needle hub 720 and permanent magnet 900 inside the distal end of the needle hub 720. Magnet 900 has an interior channel which is used to align and secure cutting tool 800. In this device, cutting tool 800 is a needle within a needle configuration such that the sample passes through central lumen 840 of the cutting tool 800 into syringe barrel (not shown). Seal or separator 930 separates permanent magnet 900 from syringe tip 160 while allowing cutting tool 800 to pass through to transfer the sample to syringe barrel 110. Pivoting platform 850 reduces the contact friction for permanent magnet 900 during rotation by minimizing the contact area between the permanent magnet 900 and the main body 910. In the alternative, or in addition, this may be included on the proximal end of the permanent magnet 900. Glue hub 920 secures needle 700 to needle hub 720 with adhesive. In this device, attachment device 750 is a Luer lock connector.

FIGS. 11A and 11B show alternate views of the device comprising a needle within a needle configuration of cutting tool 800 and needle 700 for use with the rotating motor. FIG. 11A shows one design for needle 700 comprising an opening 740 towards the distal end of the needle and a closed tip. In this embodiment of the needle within a needle design, cutting tool 800 is an open tipped needle with square aperture 830 as shown in FIG. 11B. As cutting tool 800 rotates within needle 700, the alignment of the opening 740 and aperture 830 allows material to enter the central lumen 840 of the cutting tool and upon rotation of cutting tool 800, the sample is cut by a guillotine-like mechanism.

Figure 12:
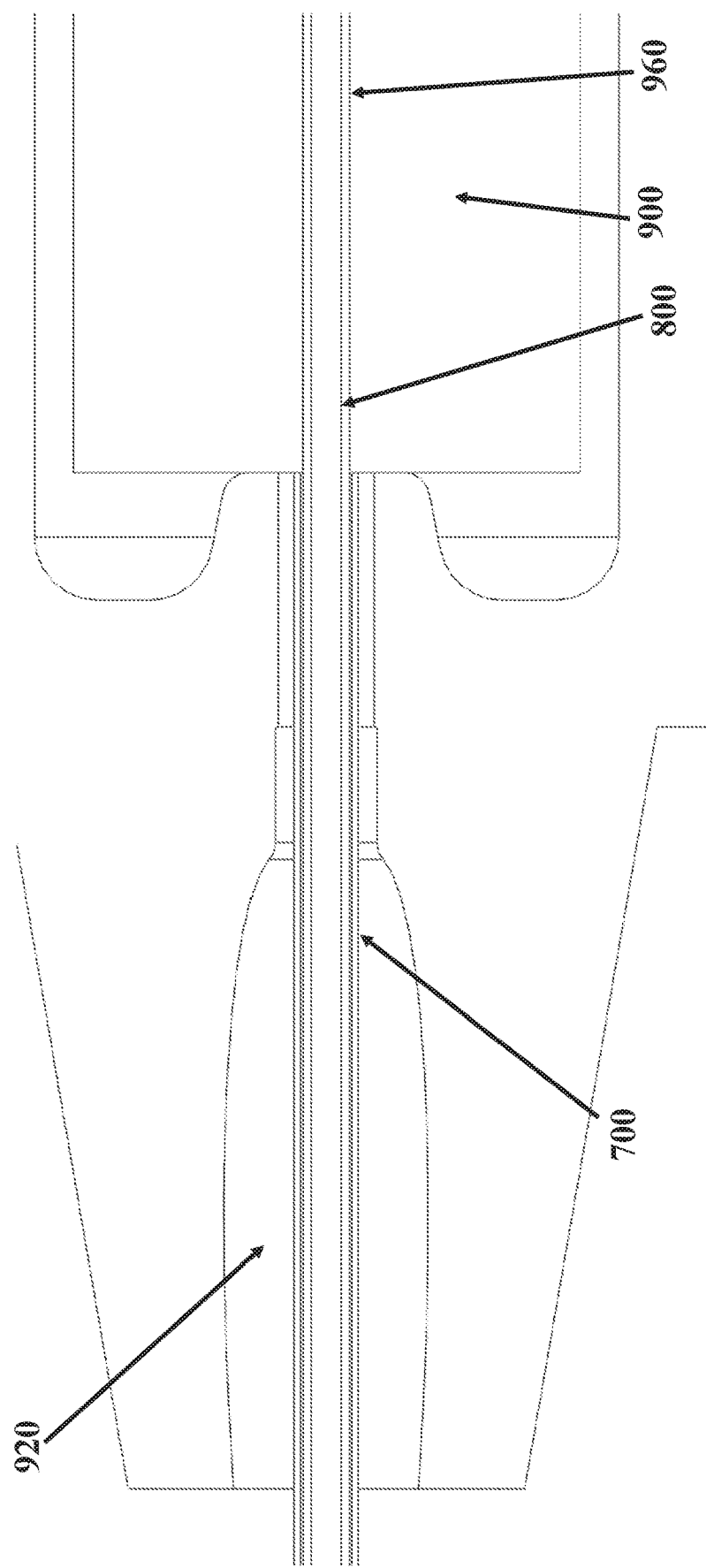
FIG. 12 shows an expanded cross-sectional view of an exemplary distal end of the needle hub comprising the glue hub and the permanent magnet.

FIG. 12 is an expanded view of the distal end of the needle hub with a needle within a needle cutting tool configuration. The needle 700 is fixed and centered in place to the needle hub at the glue hub 920. The cutting tool 800 is fixed and stabilized in interior channel 960 of the center of the permanent magnet. The rotation of permanent magnet 900 and cutting tool 800 is driven by the magnetic field generated by the stator (not shown), as described above.

Figure 13:
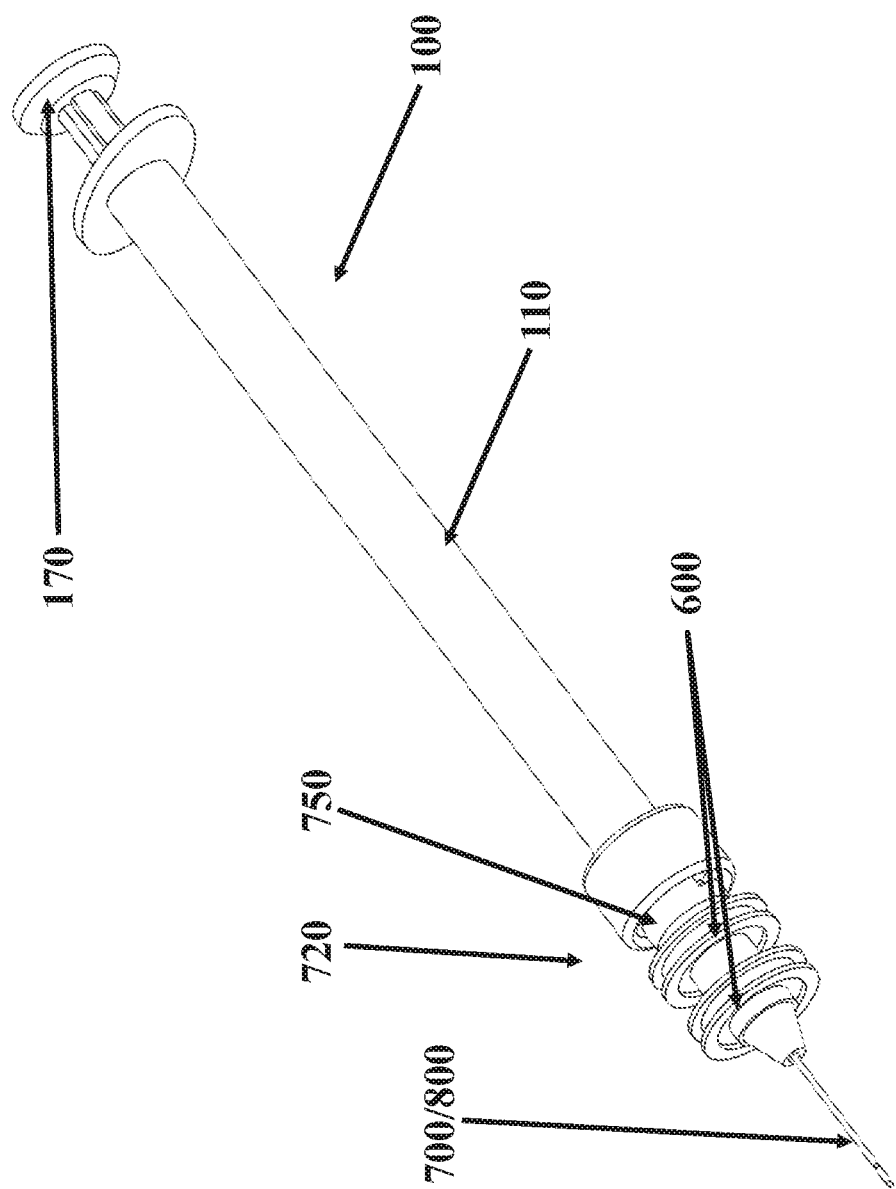
FIG. 13 shows an exemplary device having an electromagnet motor mounted to the on the distal end of the needle hub attached to a syringe.

FIG. 13 shows an exemplary device having a motor mounted on the distal end of the needle hub 720 attached to syringe 100 configured with more than one stator 600. Syringe 100 comprises syringe barrel 110 and plunger 170. Needle 700, comprising in its lumen cutting tool 800, is attached to the distal end of the syringe 100 via needle hub 720. The device may be used with any of the needle 700 and cutting tool 800 configurations described above. The distal end of needle hub 720 comprises the motor. In this design, two stators 600 are external to or mounted on the outside of the needle hub 720, such that the inner surface of the stators contacts the outer surface of the needle hub. Alternative configurations and numbers of stator rings can be applied to the device. The permanent magnet and proximal end of the cutting tool (not shown) are housed inside the needle hub 720 in main body 910. The proximal end of needle hub 720 comprises attachment device 750 for secure integration with syringe 100.

Figure 14:
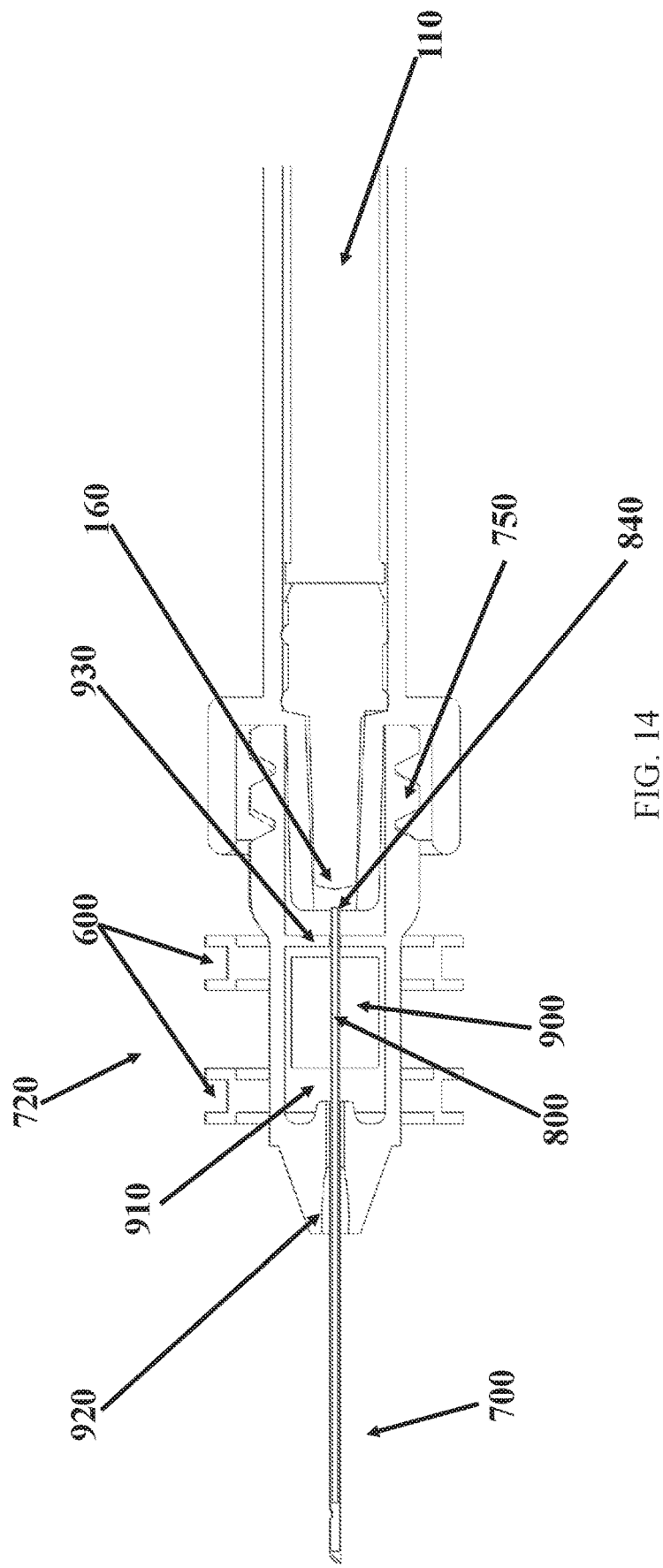
FIG. 14 shows a cross-sectional view of an exemplary device having two stators and mounted on the distal end of the needle hub.

FIG. 14 shows a cross-sectional view of an exemplary device having a motor mounted on the distal end of the needle hub 720. The polarity of the magnetic fields of stators 600 actuate permanent magnet 900 and cutting tool 800 housed in main body 910. In an alternative embodiment (not shown), a single stator and a spring or contravening force can be used to actuate permanent magnet 900 and cutting tool 800. The single spring may be adjacent to the permanent magnet 900 on either end of the main body 910. In this device, magnetic fields produced by each stator 600 result in the linear movement of the permanent magnet 900 and the cutting tool 800 (proximal to distal) within the main body 910 resulting in the cutting tool 800 moving back and forth within the lumen of the needle 700. Alternatively, a single stator may be used with a contravening force (e.g. spring) to move the permanent magnet 900 and the cutting tool 800 (proximal to distal) within the main body 910.

Permanent magnet 900 has an interior channel (not shown) which is used to align and secure cutting tool 800. In this device, cutting tool 800 is a needle within a needle configuration such that the sample passes through central lumen 840 of the cutting tool 800 into syringe barrel 110. Seal or separator 930 separates the magnet from syringe tip 160 while allowing cutting tool 800 to pass through such that the sample may be transferred to syringe barrel 110. Glue hub 920 secures needle 700 to needle hub 720 with adhesive. In this device, attachment device 750 is a Luer lock connector.

Figure 15B:
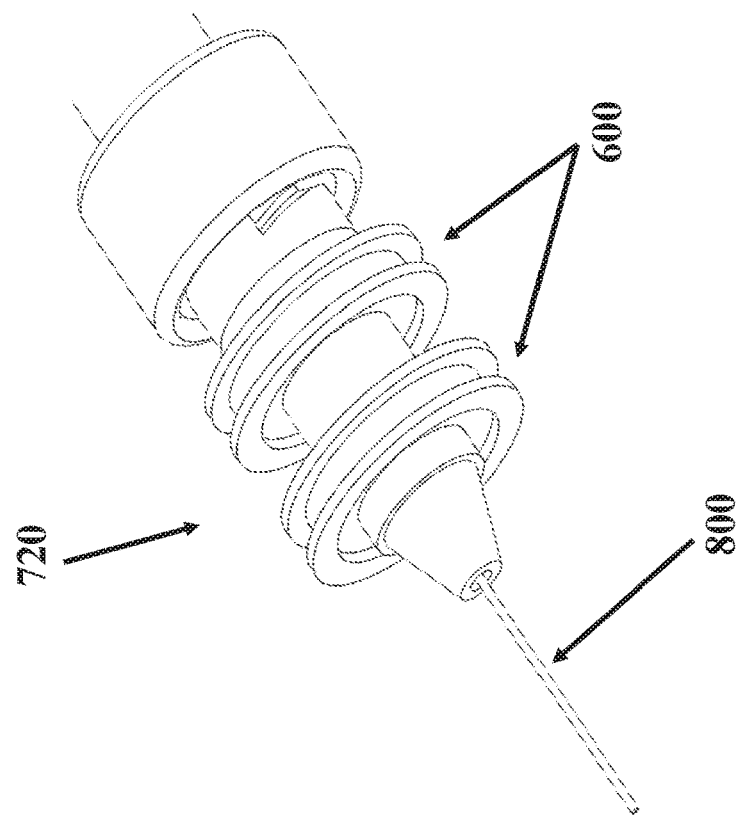
FIGS. 15A and 15B show an exemplary needle hub with a needle (FIG. 15A) and cutting tool (FIG. 15B) for an exemplary needle within a needle cutting tool configuration.
Figure 15A:
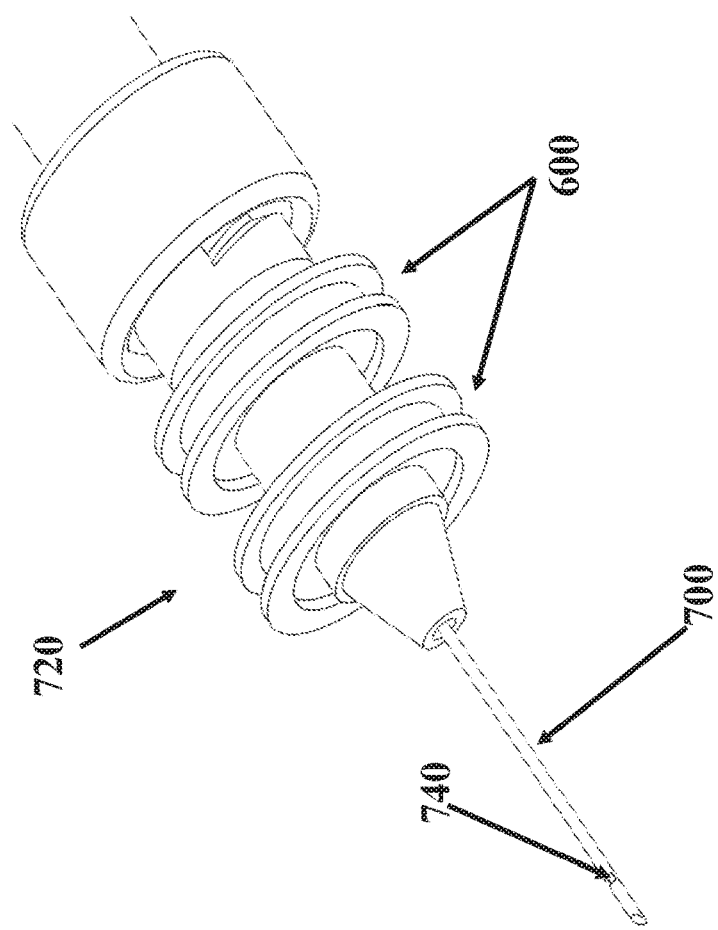

FIGS. 15A and 15B show alternate views of the device comprising a needle within a needle configuration of cutting tool 800 and needle 700. FIG. 15A shows an exemplary design for needle 700 comprising an opening 740 towards the distal end of the needle. In this needle within a needle design, cutting tool 800 is an open tipped needle as shown in FIG. 15B.

Figure 16B:
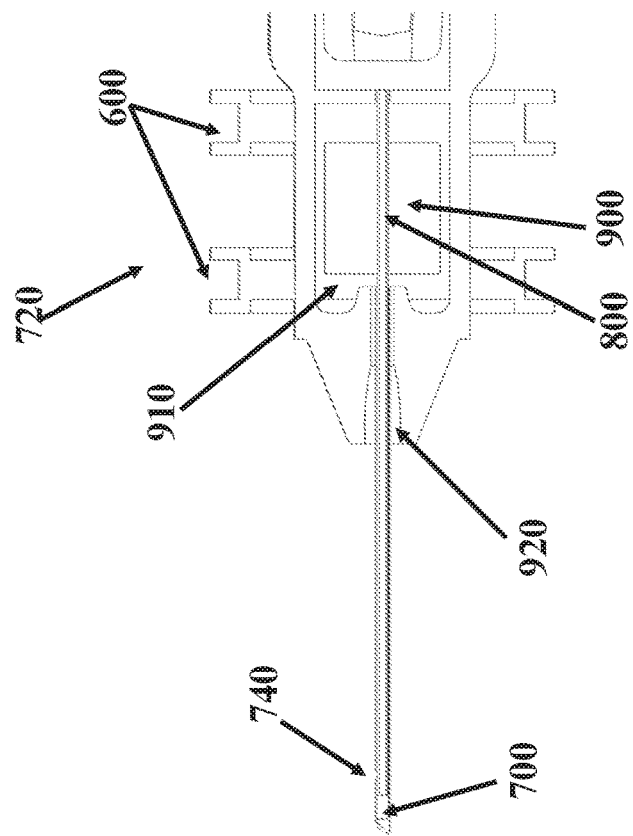
FIGS. 16A and 16B show cross-sectional view of an exemplary mechanism of action involving linear movement of the cutting tool within the lumen of the needle during operation.
Figure 16A:
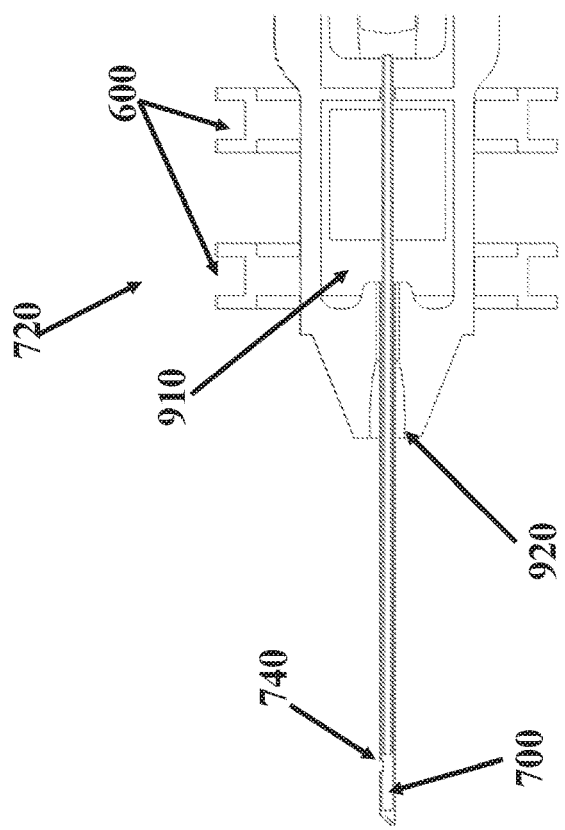

FIGS. 16A and 16B show two cross-sectional views of the device during operation to illustrate an exemplary cutting mechanism of this design. The needle 700 is centered and fixed to needle hub 720 at glue hub 920. Due to the attraction or repulsion by the magnetic fields of each stator 600, the permanent magnet 900 and the cutting tool 800 slide within the main body 910 and the cutting tool 800 moves within the lumen of the needle 700. The movement within the lumen results in cutting tool 800 passing back and forth over opening 740 thereby acting like a guillotine to cut the sample before it is transferred into the syringe barrel (not shown). In order to produce magnetic fields that either attract or repel the poles of the permanent magnet, copper wire is wrapped around each stator for roughly 200 turns in opposite direction. In this regard, the motor design resembles a linear stepper motor.

FIGS. 17-20 show exemplary embodiments of the device comprising syringe support 940 connected to the proximal end of needle hub 720 for connection of syringe tip 160 to attachment device 750. Syringe support 940 may comprise the integrated electronics and battery compartment 970, as well as a power button 950 and power indicator (e.g. LED) 960. Battery compartment 970 is accessible through a fully or partly detachable battery door 980. The syringe support may take any of various configurations to facilitate single operator use with two hands, as shown for example in FIGS. 17B, 18B, and 20B, or one hand, as shown for example in FIG. 19B. The syringe support may further comprise clear cover 990 (FIG. 20A). The syringe support, needle hub with needle and cutting tool may be provided as a sterile, single-use component for use with separately supplied standard sterile syringes. Alternatively, the syringe support may be provided with designated syringe(s), needle(s), and cutting tool(s) in a single or multiple packages.

FIGS. 17-20 further show an exemplary needle within a needle cutting tool configuration in which the inner needle cutting tool 800 rotates within the lumen of needle 700. Along the side (e.g. 1-5 mm from the tip) of needle 700 has opening 740. When aligned with aperture 830 on cutting tool 800, the sample material enters the central lumen 840 of cutting tool 800. As cutting tool 800 rotates, the aperture provides a guillotine-like cutting mechanism as it closes across opening 740. The exemplary devices may be used with any needle and cutting tool configuration and employ actuators for linear or rotational movement of the cutting tool, as described above.

Figure 17:
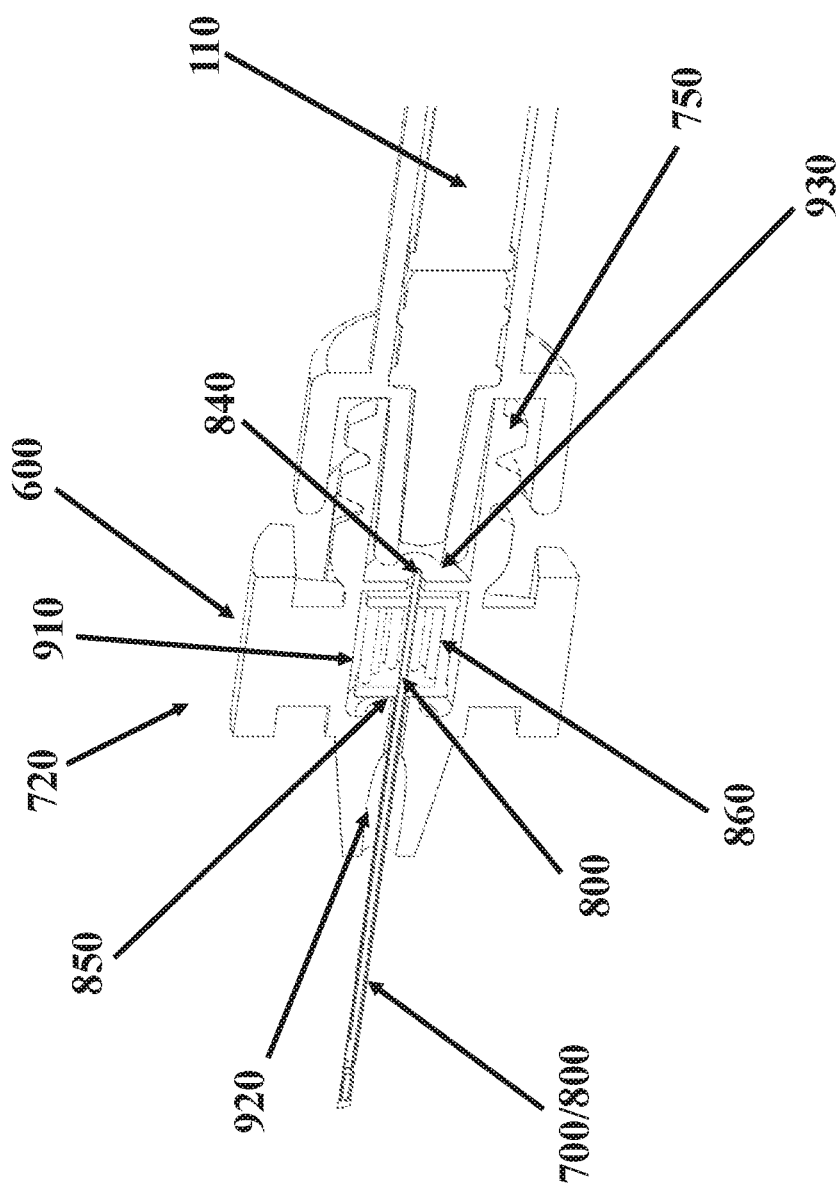
FIG. 17 shows a cross-sectional view of an exemplary device having a stator and squirrel cage mounted to the distal end of the needle hub.
Figure 18:
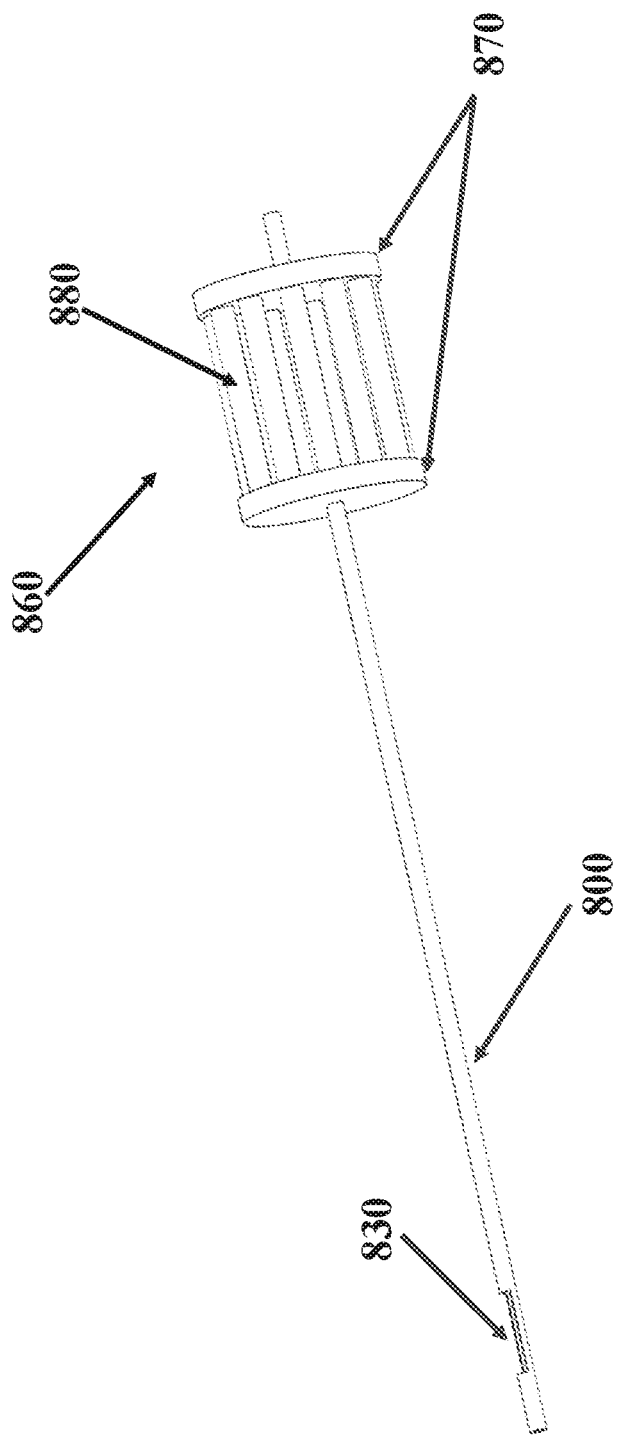
FIG. 18 shows the cutting tool for an exemplary needle within a needle cutting tool configuration integrated with a squirrel cage.
Figure 19C:
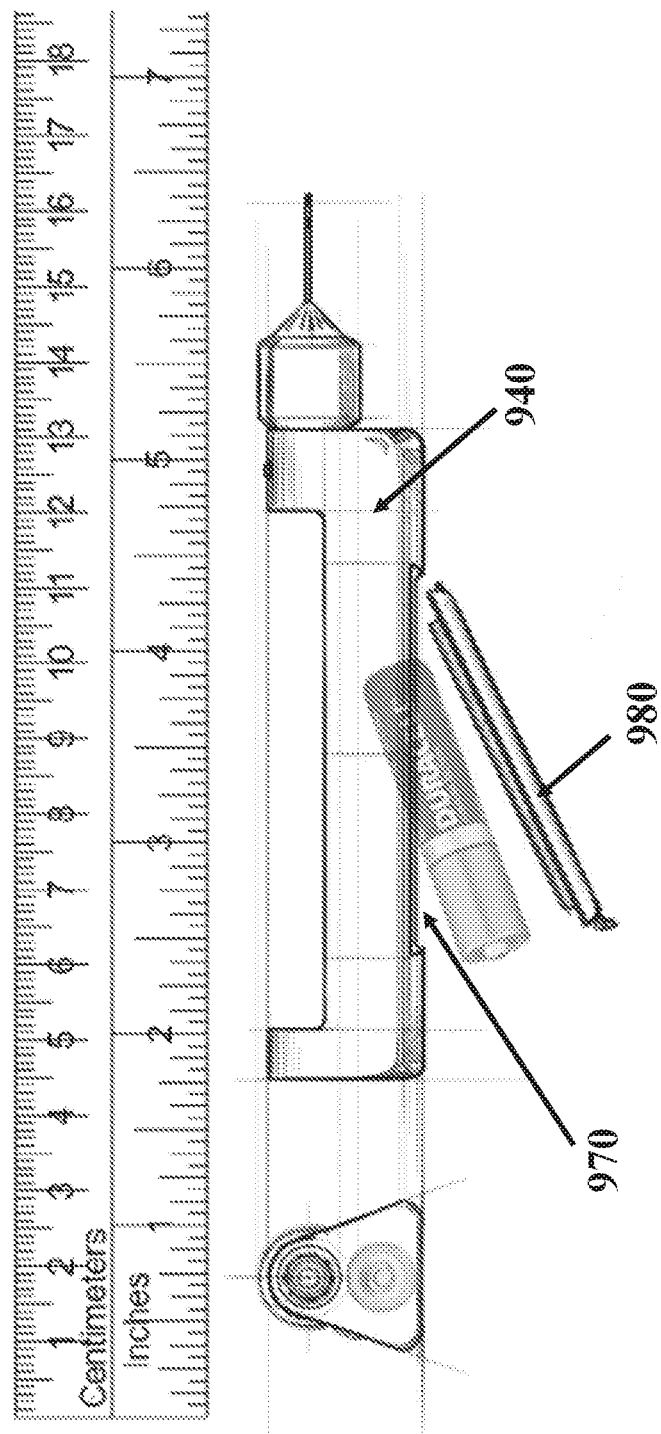
Figure 20C:
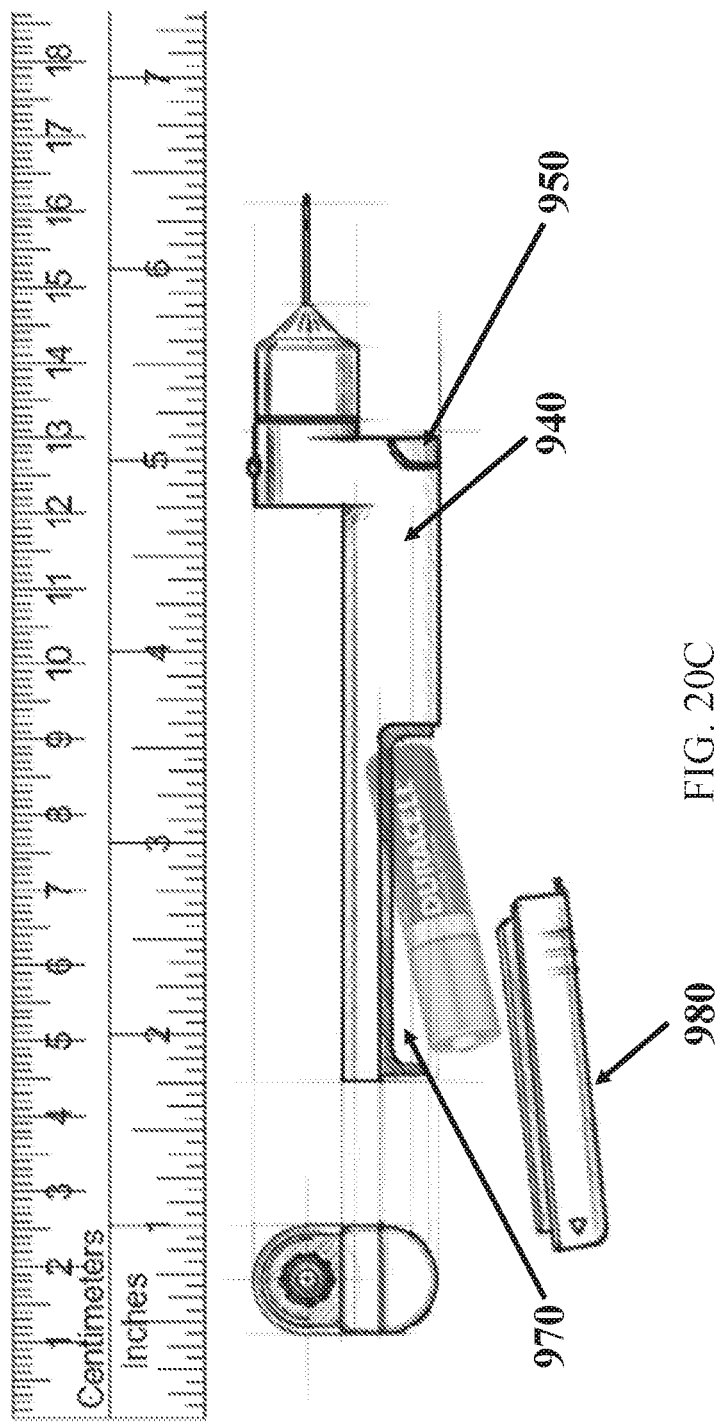
Figure 21C:
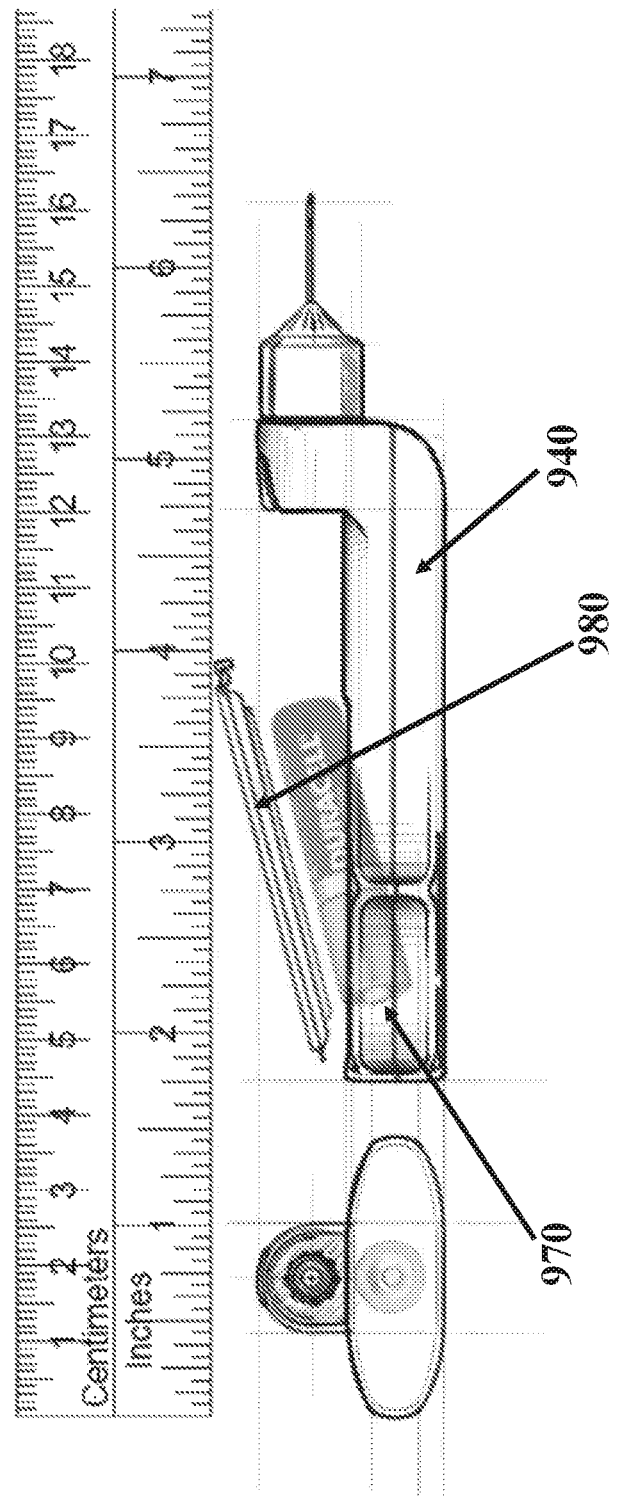
Figure 22C:
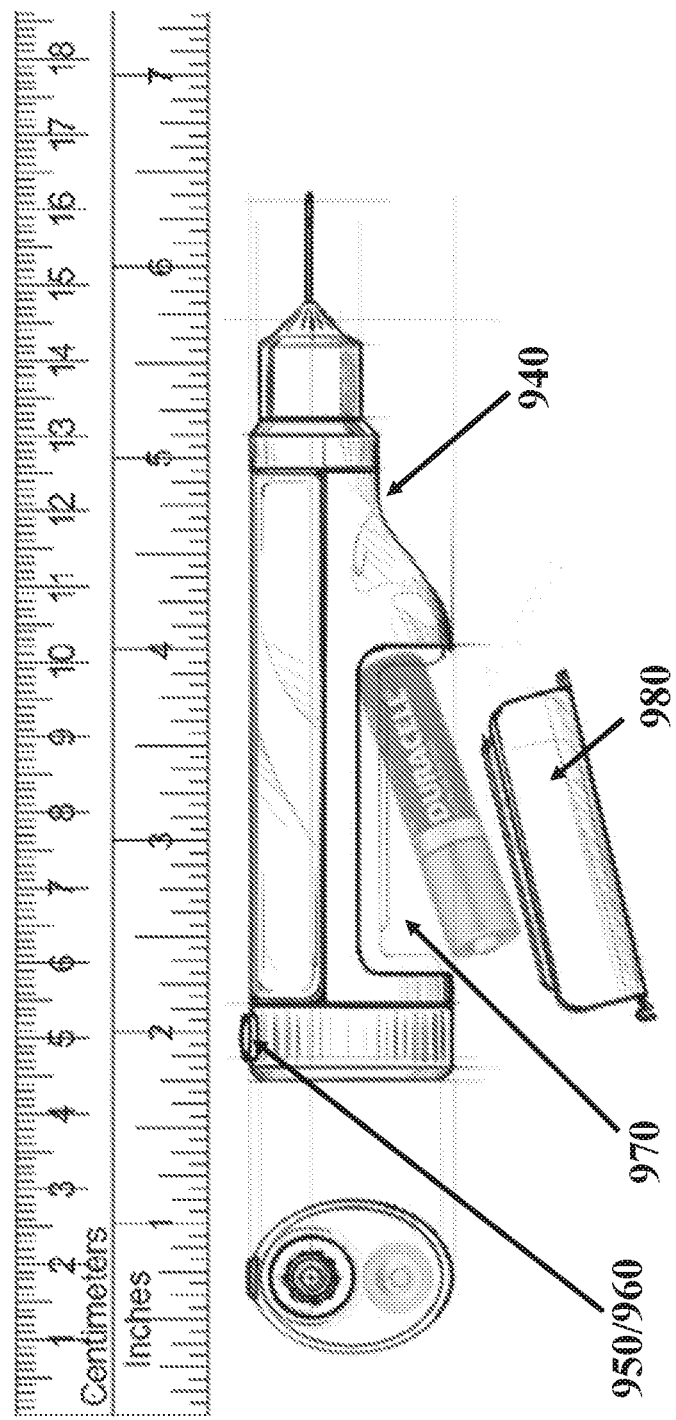

A variation of the device uses the principle of the induction motor. This design does not require a magnet as the internal rotor. Instead, a similar effect is achieved through induction. The magnet is replaced by conductive loops or squirrel-cage-like part made of metal (e.g., cooper, aluminum), as shown in FIGS. 17 and 18. The rotating magnetic field case induces electric current in the bars of the cage inside the cage, which in turns creates an electromagnetic force that causes it to rotate. This induction-motor like design can use any of the internal rotating parts/needles described in the brushless-like designs above. An induction motor can also be used for linear motion. Linear motion is due to a pulsating electric field, instead of a rotating electric field, as described for rotation and uses a reaction plate(s) in place of the permanent magnet.

FIG. 17 shows a cross-sectional view of an exemplary device having a motor mounted on the distal end of the needle hub 720 with the stator 600 mounted outside the distal end of the needle hub 720 and squirrel cage 860 inside the distal end of the needle hub 720. The size of squirrel cage 860 is configured to provide clearance around the edge to ensure a smooth rotation. Cutting tool 800 passes through the center of squirrel cage 860. Squirrel cage 860 and cutting tool 800 can spin from lower to higher speed as controlled by device user. In this device, cutting tool 800 is a needle within a needle configuration such that the sample passes through central lumen 840 of the cutting tool 800 into syringe barrel 110. Seal or separator 930 separates squirrel cage 860 from syringe tip 160 while allowing cutting tool 800 to pass through to transfer the sample to syringe barrel 110. Pivoting platform 850 reduces the contact friction for squirrel cage 860 during rotation by minimizing the contact area between the squirrel cage 860 and the main body 910. In the alternative, or in addition, this may be included on the proximal end of the squirrel cage 860. Glue hub 920 secures needle 700 to needle hub 720 with adhesive. In this device, attachment device 750 is a Luer lock connector.

FIG. 18 shows an alternate views of the device comprising a needle within a needle configuration of cutting tool 800 and squirrel cage 860. In this device, squirrel cage 860 is made up of two shorting disks 870 and a plurality of metal columns 880 spanning between the shorting disks. When a magnetic field is generated by the stator (not shown), currents are induced along the metal columns 880 generating a force that creates toque sufficient to rotate the squirrel cage 860, according to Lorentz law. Given that cutting tool 800 is fixed to two shorting disks 870 of squirrel cage 860, cutting tool 800 rotates concomitantly with squirrel cage 860. In this embodiment, cutting tool 800 is a needle within a needle design comprising an open tipped needle with square aperture 830.

Another variation of the device uses mechanical components to actuate the cutting tool. For example, a spring-like mechanism can be used to store energy and translate it into linear or rotational movement of the cutting tool. The device described herein may be used in methods of collecting samples (e.g., biological samples such as vitreous samples). In some embodiments, the method comprises: a) positioning a distal end of the needle into a region containing the sample to be collected; b) activating the actuator to rotate the cutting tool; and c) drawing sample into the collection volume. In some embodiments, the method further comprises attaching a syringe to a needle hub; removing the syringe from the needle hub; placing a cap on a collection volume for transport; and dispensing the sample from the collection volume for analysis. In some embodiments, the method is carried out without infusing material into the sample location (e.g., eye). In some embodiments, the method is carried out subsequent or prior to infusing material into the eye. In some embodiments, the method further comprises removing the syringe from the needle hub; attaching an injection fluid syringe to the needle hub, wherein the injection fluid syringe comprises a fluid to be injected; and injecting a fluid into the region. The fluid to be injected may comprise a pharmaceutical agent.

In some embodiments, collected samples are tested to identify one or more markers of interest. Identification can occur in the device or, alternatively, samples are ejected or otherwise removed from the device and tested outside of the device. In some embodiments, samples are drawn into a testing zone within the device. The testing zone comprises one or more reagents or other components that detect a marker or markers of interest. Markers of interest include, but are not limited to, proteins, peptides, nucleic acids (e.g., mRNA, microRNA, DNA, methylation status of DNA, cfDNA, etc.), hormones, metabolites, chemokines, cytokines, inflammatory markers, cancer or pre-cancer biomarkers, infectious disease agents or components or byproducts thereof, drugs and other therapeutic agents or candidate therapeutic agents, and the like. The testing zone may comprise capture particles specific for the marker(s). In some embodiments, a lateral flow strip is provided in the device that uses either a sandwich-format or a competitive format immunoassay to detect one or more markers of interest. The analysis of biomarkers find use to detect, analyze, and monitor diseases and conditions and medical interventions for such diseases and conditions including, but not limited to, infectious diseases, cancer and other proliferative diseases, diabetes (e.g., diabetic retinopathy), Alzheimer's disease, ischemic retinopathy, glaucoma, endophthalmitis, macular degeneration, vision issues, dry eye, and the like.

EXAMPLES

A prototype device was made and tested. A permanent magnet (a diametrically magnetized, nickel-plated cylinder of 0.125"+0.004" diameter and 0.250"+0.004" height from K&J Magnetics, Inc. (Item #D24DIA; Pipersville, Pa.)) was used. The cutting tool used was a 0.006" diameter hollow 304 stainless steel hypodermic tubing (Item #304H34RW; MicroGroup; Medway, Mass.) or 0.004" diameter 304 stainless steel wire (Item #9882K53; McMaster-Carr; Aurora, Ohio). Hot glue was used to attach the cutting tool and magnet to a 3D printed magnet attachment component, which was fitted into a syringe. A four-pole electromagnet motor was fixed to the outside of the syringe. The motor windings and permanent magnet allow varying of the frequency of rotation using a power amplifier and stepper motor microcontroller. Using the power amplifier and microcontroller, the internal magnet and needle rotated at set angular speeds.

The device was tested using a water sample to verify that fluid was pulled through the small cross-sectional area of the external needle with the cutting tool inside. Experiments were performed extracting milk. The sample fluids were successfully extracted with and without the cutting tool rotating. However, the data showed that when the motor is running, the extraction time is faster (>10% faster).

In addition, in experiments performed with egg yolk this design mechanism prevented the needle from clogging, as observed for a standard syringe without a cutting tool.

We claim:
1. A device comprising:
 a syringe comprising a plunger and a barrel having a longitudinal axis and a sample collection volume;
 a needle hub including an attachment device for connection with the syringe;
 wherein the syringe is connected to the needle hub;
 a syringe support connected to the needle hub; wherein the syringe support comprises a compartment, a power button, and a power indicator;
 a microcontroller positioned within the compartment;
 a needle connected to the needle hub, the needle having a lumen;
 an internal needle at least partially positioned within the lumen of the needle; wherein the internal needle is hollow; and
 a motor that rotationally moves the internal needle within the needle; wherein the motor includes one or more permanent magnets positioned inside of the needle hub and coupled to the internal needle; and wherein the motor further includes a stator with a plurality of coils mounted outside the needle hub; and
 wherein the needle has a first opening formed in a side of the needle, and the internal needle has a second opening formed in a side of the internal needle; and wherein material is allowed to enter when the second opening is aligned with the first opening, and wherein the material is cut when the second opening rotates past the first opening.

2. The device of claim 1, wherein the plurality of coils are positioned around the longitudinal axis.

3. The device of claim 1, wherein the motor is positioned outside of the barrel.

4. The device of claim 1, further comprising a battery positioned within the compartment.

5. The device of claim 1, wherein the syringe is removably connected to the needle hub.

6. The device of claim 1, wherein the needle is 20 gauge or smaller.

7. The device of claim 1, further comprising a separator that separates the one or more permanent magnets from the syringe, while allowing the inner needle to pass through to transfer a sample to the barrel.

8. The device of claim 1, further comprising a pivoting platform in contact with the one or more permanent magnets.

9. The device of claim 1, wherein the device is provided as a sterile, single-use component.

10. The device of claim 1, wherein the motor rotationally moves the internal needle at a constant speed.

11. A system comprising the device of claim 1 and a biological sample collected in the barrel.

12. The system of claim 11, wherein the biological sample collected is less than 1 mL.

13. The system of claim 12, wherein the biological sample collected is less than 250 µL.

14. The system of claim 11, wherein the biological sample is a vitreous sample.

15. A method comprising:
 collecting a biological sample with the device of claim 1 wherein the method comprises:
  a) positioning a distal end of the needle into a region containing the biological sample to be collected;
  b) engaging the power button and activating the motor to move the internal needle; and
  c) drawing the biological sample into the sample collection volume.

16. The method of claim 15, further comprising analyzing the biological sample.

17. The method of claim 16, wherein analyzing the biological sample comprises detecting biomarkers related to one or more disease or condition.

18. The method of claim 15, wherein the biological sample is a vitreous sample.

19. The method of claim 15, further comprising disposing the device after collecting the biological sample.

20. The method of claim 15, wherein drawing the biological sample into the sample collection volume comprises drawing less than 1 mL of the biological sample.

21. The method of claim 15, wherein drawing the biological sample into the collection volume comprises manually actuating the plunger with one hand while holding the device with another hand.

22. The method of claim 15, wherein collecting the biological sample is performed by a single operator with two hands.

23. The method of claim 15, wherein collecting the biological sample with the device is not performed in an operating room.

24. A device comprising:
- a syringe comprising a plunger and a barrel having a longitudinal axis and a sample collection volume;
- a needle hub including an attachment device for connection with the syringe;
- wherein the syringe is connected to the needle hub;
- a syringe support connected to the needle hub; wherein the syringe support comprises a compartment;
- a microcontroller positioned within the compartment;
- a needle connected to the needle hub, the needle having a lumen;
- an internal needle at least partially positioned within the lumen of the needle;
- wherein the internal needle is hollow; and
- a motor that rotationally moves the internal needle within the needle; wherein the motor includes one or more permanent magnets positioned inside of the needle hub and coupled to the internal needle; and wherein the motor further includes a stator with a plurality of coils mounted outside the needle hub; and
- wherein the needle has a first opening formed in a side of the needle, and the internal needle has a second opening formed in a side of the internal needle; and wherein material is allowed to enter when the second opening is aligned with the first opening, and wherein the material is cut when the second opening rotates past the first opening;
- wherein the device is provided as a sterile, single-use component.

* * * * *